United States Patent
Suzuki et al.

(10) Patent No.: US 6,569,050 B2
(45) Date of Patent: May 27, 2003

(54) HYDRAULIC CONTROL APPARATUS FOR AN AUTOMATIC TRANSMISSION

(75) Inventors: Akitomo Suzuki, Anjo (JP); Kenichi Tsuchida, Anjo (JP); Masaaki Nishida, Anjo (JP); Masahiro Hayabuchi, Anjo (JP); Takayuki Hisano, Anjo (JP); Takahiro Inoue, Anjo (JP)

(73) Assignee: Aisin Aw Co., Ltd., Anjo (JP)

( * ) Notice: Subject to any disclaimer, the term of this patent is extended or adjusted under 35 U.S.C. 154(b) by 0 days.

(21) Appl. No.: 09/742,059

(22) Filed: Dec. 22, 2000

(65) Prior Publication Data

US 2001/0009880 A1 Jul. 26, 2001

(30) Foreign Application Priority Data

Dec. 27, 1999 (JP) .......................................... H11-371811
Nov. 17, 2000 (JP) .......................................... 2000-351038

(51) Int. Cl.[7] ............................................. F16H 31/00
(52) U.S. Cl. ........................ 475/122; 475/119; 475/127
(58) Field of Search ....................... 475/119, 127; 477/906; 192/87.13, 87.18

(56) References Cited

U.S. PATENT DOCUMENTS

| | | | |
|---|---|---|---|
| 3,688,607 A | | 9/1972 | Marlow |
| 4,351,206 A | * | 9/1982 | Lemieux et al. ............. 475/127 |
| 4,785,689 A | * | 11/1988 | Iwatsuki et al. .......... 192/30 W |
| 4,903,551 A | | 2/1990 | Hiramatsu et al. |
| 5,010,786 A | | 4/1991 | Hiramatsu et al. |
| 5,334,114 A | * | 8/1994 | Ando et al. ................. 475/119 |
| 5,460,577 A | * | 10/1995 | Moroto et al. ............... 475/123 |
| 5,624,341 A | * | 4/1997 | Park ............................ 475/119 |
| 5,720,694 A | * | 2/1998 | Jang ............................ 475/121 |
| 5,890,575 A | * | 4/1999 | Ohashi et al. ............ 192/87.13 |
| 5,902,204 A | * | 5/1999 | Takagi ......................... 475/116 |
| 5,919,108 A | | 7/1999 | Takagi |
| 5,941,794 A | * | 8/1999 | Jang ............................ 477/143 |
| 6,027,427 A | * | 2/2000 | Yoo ............................. 477/130 |
| 6,102,826 A | * | 8/2000 | Takahashi et al. .......... 475/119 |
| 6,159,124 A | * | 12/2000 | Redinger et al. ............ 475/131 |
| 6,302,822 B1 | * | 10/2001 | Suzuki et al. ............... 477/143 |
| 6,319,165 B1 | * | 11/2001 | Itou et al. ................... 475/119 |
| 6,478,707 B1 | * | 11/2002 | Jang ............................ 475/119 |

FOREIGN PATENT DOCUMENTS

| | | | |
|---|---|---|---|
| EP | 0 330 408 | * | 8/1989 |
| EP | 0 694 713 A2 | | 1/1996 |
| EP | 1 031 770 A2 | | 8/2000 |
| EP | 1 039 179 A2 | | 9/2000 |
| JP | 2689421 | | 8/1997 |

* cited by examiner

*Primary Examiner*—Rodney H. Bonck
*Assistant Examiner*—David D. Le
(74) *Attorney, Agent, or Firm*—Oliff & Berridge, PLC

(57) ABSTRACT

A hydraulic control apparatus for an automatic transmission including a hydraulic pressure source, hydraulic paths, hydraulic servos for operating friction elements which are coupled with the hydraulic source an the hydraulic paths, a control device arranged on the hydraulic paths for operating engagement release through supply/removal of hydraulic pressure to the hydraulic servos and valves which are arranged on the hydraulic path for cutting off hydraulic pressure from the hydraulic pressure source to the hydraulic servo with hydraulic pressure in the downstream side of the control device as signal pressure.

18 Claims, 11 Drawing Sheets

| POSITION | | CLUTCH/BRAKE | | | | | | SOLENOID VALUE | | | | |
|---|---|---|---|---|---|---|---|---|---|---|---|---|
| | | C-1 | C-2 | C-3 | B-1 | B-2 | F-1 | SLC1 | SLC2 | SLC3 | SLB1 | SL1 |
| | | | | | | | | N-O | N-O | N-O | N-O | N-C |
| P | | | | | | | | ○ | ○ | ○ | ○ | × |
| R | | | | ○ | | ○ | | ○ | ○ | × | ○ | × |
| N | | | | | | | | ○ | ○ | ○ | ○ | × |
| D | 1ST | ○ | | | | △ | ○ | × | ○ | ○ | ○ | × |
| | 2ND | ○ | | | ○ | | | × | ○ | ○ | × | × |
| | 3RD | ○ | | ○ | | | | × | ○ | × | ○ | × |
| | 4TH | ○ | ○ | | | | | × | × | ○ | ○ | ○ |
| | 5TH | | ○ | ○ | | | | ○ | × | × | ○ | ○ |
| | 6TH | | ○ | | | ○ | | ○ | × | ○ | × | ○ |
| ELECTRIC FAILURE DURING DRIVING | 1ST 2ND 3RD | ○ | | ○ | | | | × | × | × | × | × |
| | 4TH | ○ | ○ | | | | | × | × | × | × | × |
| | 5TH | | ○ | ○ | | | | × | × | × | × | × |
| | 6TH | | ○ | | | ○ | | × | × | × | × | × |
| RE-STARTING | | ○ | | ○ | | | | × | × | × | × | × |
| NOTES | ○ | ENGAGEMENT | | | | | | CURRENT PRESENT | | | | |
| | × | — | | | | | | CURRENT ABSENT | | | | |
| | △ | E/B TIME ENGAGEMENT | | | | | | | | | | |

N-O : NORMAL OPEN (OUTPUT HYDRAULIC PRESSURE DURING ABSENCE OF CURRENT)
N-C : NORMAL CLOSE (DOES NOT OUTPUT HYDRAULIC PRESSURE DURING ABSENCE OF CURRENT)

FIG.2

|  | C-1 | C-2 | C-3 | B-1 | B-2 | F-1 |
|---|---|---|---|---|---|---|
| P |  |  |  |  |  |  |
| R |  |  | ○ |  |  | ○ |
| N |  |  |  |  |  |  |
| 1 SPEED | ○ |  |  |  |  | ○ |
| 1 SPEED (E/G BRAKE) | ○ | ⑤ |  |  | ○ |  |
| 2 SPEED | ○ | ⑤ |  | ○ |  |  |
| 3 SPEED | ○ |  | ○ | ④ | ⑥ |  |
| 4 SPEED | ○ | ○ | ② |  | ⑥ |  |
| 5 SPEED | ① | ○ | ○ | ④ |  |  |
| 6 SPEED | ① | ○ | ③ | ○ |  |  |
| RE-STARTING | ○ | ⑤ | ○ | ④ |  |  |

| DRAIN ELEMENT | VALVE NAME | SIGNAL PRESSURE |
|---|---|---|
| ① | C1 RELEASE VALVE | C2, C3 C2, B1 |
| ② | B1/C3 RELEASE VALVE | C1, C2 |
| ③ | C3 RELEASE VALVE | C2, B1 |
| ④ | B1 RELEASE VALVE | C3 |
| ⑤ | C2-B2 SUPPLY RELAY VALVE | SOL. 1 |
| ⑥ | B2 CONTROL VALVE | C2 B1 C3 |

|  | C-1 | C-2 | C-3 | B-1 | B-2 | F-1 |
|---|---|---|---|---|---|---|
| P |  |  |  |  |  |  |
| R |  |  | ○ |  |  | ○ |
| N |  |  |  |  |  |  |
| 1 SPEED | ○ |  |  |  |  | ○ |
| 1 SPEED (E/G BRAKE) | ○ |  |  |  | ○ |  |
| 2 SPEED | ○ | ⑤ | ③ | ○ |  |  |
| 3 SPEED | ○ | ⑤ | ○ | ④ |  |  |
| 4 SPEED | ○ | ○ | ② | ⑥ |  |  |
| 5 SPEED | ① | ○ | ○ | ④ | ⑥ |  |
| 6 SPEED | ① | ○ | ③ | ○ | ⑥ |  |
| RE-STARTING | ○ | ⑤ | ○ | ④ |  |  |

| DRAIN ELEMENT | VALVE NAME | SIGNAL PRESSURE |
|---|---|---|
| ① | C1 RELEASE VALVE | C2, C3 C2, B1 |
| ② | B1/C3 RELEASE VALVE | C1, C2 |
| ③ | C3 RELEASE VALVE | B1 |
| ④ | B1 RELEASE VALVE | C3 |
| ⑤ | C2-B2 SUPPLY RELAY VALVE | SOL. 1 |
| ⑥ | B2 CONTROL VALVE | C2 B1 C3 |

| | C1 | C2 | C3 | B1 | B2 | F1 |
|---|---|---|---|---|---|---|
| P | | | | | | |
| R | | | ○ | | ○ | |
| N | | | | | | |
| 1 SPEED | ○ | ⑤ | | | | ○ |
| 1 SPEED (ENGINE/BRAKED) | ○ | ⑤ | | | ○ | |
| 2 SPEED | ○ | ⑤ | | ○ | ⑥ | |
| 3 SPEED | ○ | ⑤ | ○ | ④ | ⑥ | |
| 4 SPEED | ○ | ○ | ② | | ⑥ | |
| 5 SPEED | ① | ○ | ○ | ④ | ⑥ | |
| 6 SPEED | ① | ○ | ○ | ③ | ○ | |
| RE-STARTING | ○ | ⑤ | ○ | ④ | | |

| DRAIN ELEMENT | VALVE NAME | SIGNAL PRESSURE |
|---|---|---|
| ① | C1 CUT-OFF VALVE | C2 PRESSURE AND C3 PRESSURE, C2 PRESSURE AND B1 PRESSURE |
| ② | B1/C3 CUT-OFF VALVE | C1 PRESSURE AND C2 PRESSURE |
| ③ | B1 APPLY RELAY VALVE | SLB1 |
| ④ | C3 APPLY RELAY VALVE | SLC3 |
| ⑤ | C2 SUPPLY RELAY VALVE | SOL1 |
| ⑥ | B2 CUT-OFF VALVE | C2 PRESSURE, B1 PRESSURE, C3 PRESSURE |

| SLB1 | SLB1 RELEASE VALVE | SLC3 |
|---|---|---|
| SLC3 | SLC3 RELEASE VALVE | C2 PRESSURE AND B1 PRESSURE |

FIG.9

| | C1 | C2 | C3 | B1 | B2 | F1 |
|---|---|---|---|---|---|---|
| P | | | | | | |
| R | | | ○ | | ○ | |
| N | | | | | | |
| 1 SPEED | ○ | | | | | ○ |
| 1 SPEED (ENGINE/BRAKED) | ○ | | | | ○ | |
| 2 SPEED | ○ | ⑤ | | ③ | ○ | |
| 3 SPEED | ○ | | ○ | ④ | | |
| 4 SPEED | ○ | ○ | ② | | ⑥ | |
| 5 SPEED | ① | ○ | ○ | ④ | | |
| 6 SPEED | | ○ | ③ | ○ | | |
| RE-STARTING | ○ | ⑤ | ③ | ○ | | |

| DRAIN ELEMENT | VALVE NAME | SIGNAL PRESSURE |
|---|---|---|
| ① | C1 CUT-OFF VALVE | C2 PRESSURE AND C3 PRESSURE, C2 PRESSURE AND B1 PRESSURE |
| ② | B1/C3 CUT-OFF VALVE | C1 PRESSURE AND C2 PRESSURE |
| ③ | B1 APPLY RELAY VALVE | SLB1 |
| ④ | C3 APPLY RELAY VALVE | SLC3 |
| ⑤ | C2 SUPPLY RELAY VALVE | SOL1 |
| ⑥ | B2 CUT-OFF VALVE | C2 PRESSURE, B1 PRESSURE, C3 PRESSURE |

| SLB1 | SLB1 RELEASE VALVE | C3 PRESSURE AND D-RANGE PRESSURE |
|---|---|---|
| SLC3 | SLC3 RELEASE VALVE | SLB1 |

FIG.11

HYDRAULIC CONTROL APPARATUS FOR AN AUTOMATIC TRANSMISSION

BACKGROUND OF THE INVENTION

1. Field of Invention

The invention relates to an automatic transmission mounted in a vehicle. In particular, the invention relates to a hydraulic control apparatus which controls the friction element in the transmission mechanism.

2. Description of Related Art

In order to control an automatic transmission for a vehicle, a hydraulic circuit controls the clutch and the brake (referred to as friction elements). The hydraulic circuit uses a specialty control valve (linear solenoid valve or duty solenoid valve) for each hydraulic servo (i.e., servo mechanism) of each friction element while independently controlling each valve. The control valves in the hydraulic circuit are permanently open to output hydraulic pressure in order to maintain certain running capabilities for the vehicle by outputting hydraulic pressure to the hydraulic servo even when signals to the control valves fail. Hence, if all of the control valves experience signal failure or stick failure simultaneously, the friction elements become engaged simultaneously. In order to avoid such a condition, Japanese patent publication No. 2689421, proposes a method in which a predetermined forward speed is achieved even when the control valves continue to output hydraulic pressure due to electrical failure or stick failure during the forward movement of the vehicle.

In the hydraulic circuit, the predetermined forward speed is established when the failure occurs while the vehicle is moving forward. However, if the vehicle is stopped and the engine is turned off after a failure occurs, for example, and the engine is turned on once again with the transmission shifted to drive (hereafter "during an engine restart time"), or the transmission is shifted to drive after shifting to neutral or park, or if a condition occurs in which all of the released friction elements now supply hydraulic pressure to all of the friction elements, the predetermined forward speed remains.

A higher predetermined forward speed is preferred so that a driver does not experience an unexpected downshift feeling when a failure occurs during actual driving. However, when a vehicle is stopped and restarted after a failure during running, a lower vehicle speed is preferred because a certain amount of driving power is needed in restarting. If the achieved speed is only one speed, like in the aforementioned hydraulic circuit, an awkward predetermined forward speed must be established, which neither eliminates the downshift feeling nor secures the driving power due to the two contradicting requirements described above.

Hence, the invention provides a hydraulic control apparatus which establishes at least two speeds to satisfy the two aforementioned requirements, the elimination of the downshift feeling caused by a failure during driving and securing a sufficient amount of driving power to restart the vehicle after the occurrence of a failure.

SUMMARY OF THE INVENTION

In a first exemplary aspect of a hydraulic control apparatus, the hydraulic control apparatus comprises a hydraulic source (51), a first, a second and a third hydraulic paths (L32, L31, L5) which are connected to the hydraulic source (51), a first, a second and a third hydraulic servos (82, 81, 83, 84) which are connected with the first, second and third hydraulic paths (L32, L31, L5) and which operate a first, a second and a third friction elements (C-2, C-1, C-3, B-1) wherein predetermined forward speeds out of a plurality of speeds are achieved by engagement of at least two friction elements, a first, a second and a third control means (72, 71, 73, 74) which are arranged in the first, second, and third hydraulic paths (L32, L31, L5) and operate an engagement release through a supply and removal of hydraulic pressure to the first, second and third servos (82, 81, 83, 84) wherein, in the predetermined forward speeds, the first friction element (C-2) and the third friction element (c-3, B-1) are engaged by the first and third control means (72, 73, 74), a first valve (55) which is arranged in the second hydraulic path (L31) and which cuts off hydraulic pressure from the hydraulic source (51) to the second hydraulic servo (81) with downstream side hydraulic pressure, as a signal pressure, from at least the first control means (72); and a second valve (60) which is arranged in the first hydraulic path (L32) and which cuts off hydraulic pressure to the first hydraulic servo (82) and the signal pressure, wherein the downstream side hydraulic pressure of the first control means (72) and the downstream side hydraulic pressure of the third control means (73, 74) can be impressed as signal pressures to the first valve (55), the first valve (55) cuts off the hydraulic pressure from the hydraulic source (51) to the second hydraulic servo (81) when both of the signal pressures are impressed.

In the above-described composition, installation of the second valve (60) enables the supply of hydraulic pressure to the second hydraulic servo (81) when a position is assumed wherein hydraulic pressure to the first hydraulic servo (82) and a signal pressure to the first valve (55) are cut off However, the supply of hydraulic pressure to the second hydraulic servo is cut off, though the supply of hydraulic pressure to the first hydraulic servo is enabled, when the position to not cut off is assumed. Hence, engagement of various friction elements is enabled due to the position of the second valve, this achieving the least two forward speeds.

In other exemplary aspects, the hydraulic control apparatus further comprises, a third valve (53) arranged in between the hydraulic source (51) and the first and second control means (72, 71) and which is capable of selectively switching the supply and cutting off of hydraulic pressure to the first and second control means (72, 71), wherein, the second valve (60) assumes a position to cut off hydraulic pressure to the first hydraulic servo (82) and the signal pressure to the first valve (55) when the third valve (53) assumes a position to cut off hydraulic pressure to the first and second control means (72, 71).

In the above-described composition, by making the second valve (60) cut off the hydraulic pressure to the first hydraulic servo (82) and signal pressure to the first valve (55), when the third valve (53) assumes the position to cut off hydraulic pressure to the first and the second control means (72, 71), supply of hydraulic pressure to the first hydraulic servo (82) and the signal pressure to the first valve (55) are cut off even when the third valve (53) later assumes the position to supply hydraulic pressure to the first and the second control means (72, 71), enabling separate formation of forward speed, which makes it possible to set the different forward speed during operation of driving again by re-starting the engine from the condition in which the first and the second friction elements (C-2, C-1) are both released.

In other exemplary aspects, the second valve (60) is arranged in an upstream side of a signal pressure supply hydraulic path (L32), a branch of the first hydraulic path, to the first valve (55). Thus cutting off of hydraulic pressure to the first hydraulic servo (82) and the signal pressure to the first valve (55) may be achieved by one valve, which allows the size of the apparatus to be reduced.

In other exemplary aspects, the control apparatus is structured such that wherein when the first control means (32) outputs hydraulic pressure and a condition changes from engagement of the first friction element (C-2) to the second control means (71) ready to output hydraulic pressure, enabling supply of hydraulic pressure to the second hydraulic servo (81), at least predetermined forward speeds (5, 6 speed) are achieved by releasing the second friction element (C-1) using at least the first valve (55), and when the predetermined forward speed is high speed, the first friction element is released at a low speed and is engaged at a high speed, and the second friction element (C-1) which is released by hydraulic pressure to the first friction element (C-2) is engaged at low speeds (1, 2, 3 speed) and is released at high speeds.

In the above-described composition, if the supply of hydraulic pressure to the hydraulic servo, which operates the second friction element (C-1), is enabled due to occurrence of a failure during driving with the first friction element (C-2) of the vehicle engaged, high speed is achieved due to the release of the second friction element (C-1) which is engaged at low speed by hydraulic pressure to the first friction element (C-2) which is engaged at high speed, hence unnecessary down shift is prevented. Moreover, during re-starting of the vehicle after failure during running, supply of hydraulic pressure to hydraulic servo of the second friction element (C-1) which is engaged at low speed is enabled due to the cutting off of hydraulic pressure for the hydraulic servo of the second friction element (C-1) which is engaged at high speed to be applied to the first valve (55). Moreover, hydraulic pressure to the hydraulic servo of the first friction element (C-2) which is engaged at high speed is also cut off, establishing low speed without fail and assuring the driving power during re-starting of the vehicle.

In other exemplary aspects, the control apparatus comprises a signal pressure generation means for selectively switching the second valve (60) to the hydraulic pressure supply or cut-off positions to the first hydraulic servo (82), wherein the signal pressure generation means is a solenoid valve (75), capable of generating hydraulic pressure through electrical operation, and the solenoid valve (75) switches, when there is no electric current, the position of the second valve (60) to the position of cutting off hydraulic pressure to the first hydraulic servo (82).

In the above-described composition, supply or cut-off of hydraulic pressure to the hydraulic servo which operates the friction element may be selectively executed with a compact structure, enabling reduction in the size of the hydraulic control apparatus.

In other exemplary aspects, the second valve (60) is structured such that a spring force is given from one side and a signal pressure from the signal pressure generation means is applied from the other side, and the signal pressure generation means switches, by cutting off hydraulic pressure when there is no electric current, the position of the second valve (60) to the position of cutting off hydraulic pressure to the first hydraulic servo (82) by the spring force.

In the above-described composition, stabilization of the entire hydraulic control apparatus against hydraulic pressure is achieved by switching a position to cut off supply of hydraulic pressure to the first friction element (C-2) by spring force after cutting off hydraulic pressure when electric current is stopped, unlike a case in which switching of a position to cut off supply of hydraulic pressure to the friction element by supplying hydraulic pressure against spring force during the time of stopping current.

In other exemplary aspects, the control apparatus further comprises the third friction element (B-1) which is released with the first friction element (C-2) during the low speed (3 speed) time and the third hydraulic servo (84) which operates the third friction element (B-1), and a fourth valve (58) which switches with hydraulic pressure, as signal pressure, to a hydraulic servo (83) which operates a fourth friction element (C-3) for engaging hydraulic pressure supply or cut-off state time the third hydraulic servo during the low speed (3 speed) time. Thus, the low speed is achieved and driving force during re-starting is secured.

In other exemplary aspects, the low speed comprises a first forward speed, a second forward speed with the speeds consecutively increasing. Thus, even during the low speed, the third forward speed, a high speed, is achieved and power is secured, enabling near normal driving.

In other exemplary aspects, the control apparatus further comprises a fifth valve (56, 57) for switching hydraulic pressure supply or cut-off to the hydraulic servo (83) which operates the fourth friction element (C-3) to be engaged during the time of the third forward speed (3 speed) with hydraulic pressure, as signal pressure, to the second hydraulic servo (81, 84) which operates fiction elements to be engaged during the time of the predetermined forward speed (4, 6 speed), and hydraulic pressure to the first hydraulic servo (82) which is operated by the signal pressure generation means, is applied, as signal pressure, to the fifth valve (56, 57).

Moreover, in a vehicle where the fourth friction element (C-3) which engages during the third forward speed (3 speed) is released by the friction elements (C-1, B-1)which engages during the predetermined forward speed (4, 6 speed), early supply of hydraulic pressure to the hydraulic servo (81, 84) which operates the friction element which engages during the predetermined forward speed causes release of hydraulic pressure for the hydraulic servo (83), to be applied to the fourth valve (58), which operates the fourth friction element (C-3), which makes it impossible to achieve the third forward speed. However, hydraulic pressure for the hydraulic servo (82) which operates the first friction element (C-2) to be switched by the signal pressure generation means is applied to the fifth valve (56, 57), hence the fifth valve stop operation, enabling supply of hydraulic pressure to be applied to the fourth valve (58), and the third forward speed (3 speed) is achieved without fail.

In other exemplary aspects, the control apparatus further comprises a sixth valve (57) for switching hydraulic pressure supply or cut-off to the hydraulic servo (83) which operates the fourth friction element (C-3) to be engaged during the third forward speed (3 speed) with hydraulic pressure, as signal pressure, to the hydraulic servo (84) which operates the friction element (B-1) to be engaged during the time of predetermined forward speed (2, 6 speed), and the sixth valve (57) comprises a delay means (77) which delays hydraulic pressure supply speed to the hydraulic servo (84) which operates the friction element (B-1) to be applied to the sixth valve (57).

In the case of cutting off the supply of hydraulic pressure to the hydraulic servo (84), which operates friction element (B-1) in order to release, as signal pressure, the hydraulic pressure to the hydraulic servo (83) which operates the fourth friction element (C-3) which engages during the third forward speed, if the hydraulic pressure, as signal pressure, to the hydraulic servo (83) which operates the fourth friction element (C-3) functions as signal pressure from the hydraulic servo (84) which operates other friction element (B-1) during other forward speed (2, 6 speed) to cut off supply of hydraulic pressure, early supply of hydraulic pressure from the hydraulic servo (84) which operates other friction element cuts off the supply of hydraulic pressure to the hydraulic servo (83) which operates the fourth friction element. Hence, signal pressure to cut off friction element (B-1) which should be cut off to achieve the third forward speed is not applied, making it impossible to achieve the third forward speed. However, a delay means is provided to assure cutting off of the friction element without fail by the signal pressure to the fourth friction element (C-3).

In various other exemplary aspects, the predetermined forward speed is the second forward speed (3 speed), the friction element to be released with the first friction element (C-2) during the time of the second forward speed is the fourth friction element (C-3) to be engaged during the third forward speed (3 speed) time, and the friction element to be engaged during the second forward speed (2 speed) time is the third friction element (B-1) to be released during the third forward speed (3 speed) time.

In the above-described composition, the second forward speed is secured even if a failure occurs during driving with the second forward speed. Hence, unnecessary speed change is prevented even during driving with the second speed, eliminating uncomfortable feeling for a driver. Furthermore, by providing a delay means, the friction element is cut off without fail by a signal pressure of the fourth friction element (C-3).

In various other exemplary aspects, the second valve (60) is structured in such a manner that the hydraulic pressure to the hydraulic servo (82), which operates the friction element (C-2) to be released during the low speed (1, 2, 3 speed) time, is applied to the second valve (60), and the hydraulic pressure supply state is enabled by running current to the signal pressure generation means (75) when the friction element (C-2) is engaged, after which the hydraulic pressure supply enable state is maintained even if the current is stopped.

In the above-described composition, if the friction element (C-2) which engages during the time of high speed (4, 5, 6 speed) is once engaged, hydraulic pressure supply state is maintained by the hydraulic pressure to be supplied to the hydraulic servo (82), which operates the friction element (C-2), and supply of hydraulic pressure for the friction element (C-2) is not cut off and high speed is achieved without fail, even when failure occurs during high speed driving, stopping electric current to the signal pressure generation means. Furthermore, even if a failure occurs during low speed driving, stopping the electric current to the signal pressure generation means, the switching valve assumes the position to cut off supply of hydraulic pressure to the friction element, hence the low speed is achieved without fail.

In various other exemplary aspects, the control apparatus further comprises the third friction element (B-1, C-3) and a third control means (74, 73) for controlling the engagement and release by supplying and removing hydraulic pressure to the hydraulic servo (83, 84), which operates the third friction element, when the first control means (72) and the second control means (71) output hydraulic pressure, condition changes from engagement of the first friction element (C-2) and the second friction element (C-1) to the third control means (74, 73) ready to output hydraulic pressure, enabling supply of hydraulic pressure to the hydraulic servo (84, 83), the forward speed (4 speed) differing from the predetermined forward speed (5, 6 speed) is further achieved, and the second friction element (C-1) to be released with hydraulic pressure, as signal pressure, to the hydraulic servo (82) which operates the first friction element (C-2) achieves forward speed differing from the predetermined forward speed by releasing the third friction element (B-1, C-3) with hydraulic pressure, as signal pressure, to the hydraulic servo (81) which operates the second friction element at a different time of forward speed (4 speed) than the predetermined forward speed (5, 6 speed).

Moreover, some vehicles are structured in such a manner that when a failure occurs during driving of a vehicle, the forward speed is maintained by providing a valve which mechanically cuts off supply of hydraulic pressure to the friction element to be released with hydraulic pressure, as signal pressure, to the friction element engaged during each forward speed, in order to maintain forward speed at the time of failure, and by mechanically cutting off even if condition arises in which the control means to operate friction element to be released outputs hydraulic pressure due to electrical failure and the like, but a problem with such circuit is that when a failure occurs during driving and when subsequent stopping of vehicle causes turning off of the engine, release condition occurs due to removal of hydraulic pressure to each friction element. When the range is switched in order to start the vehicle by turning on the engine, because of the failure which occurred during driving, all the control means which operate each friction element output hydraulic pressure, causing all the friction elements to be in hydraulic pressure supply enable condition. In such a case, the circuit of above structure creates a problem in which, if a different forward speed (4 speed) is achieved by mechanically cutting off of hydraulic pressure supply to the friction element (B-1) to be released with a different forward speed (5, 6 speed) from predetermined forward speed with hydraulic pressure, as signal pressure, to the friction element (C-1) which is to be released with hydraulic pressure, as signal pressure, to predetermined friction element with predetermined forward speed (5, 6 speed), either forward speed to be established by the supply speed of the hydraulic pressure for friction element to be applied to the plurality of valves as signal pressure changes, or forward speed is not established due to occurrence of valve hunting. However, the problem of valve hunting is eliminated by compulsory preventing occurrence of one of two signal pressure regardless of speed of hydraulic pressure supply, hence, predetermined forward speed is established without fail. Here, instead of creating such structure, switching of hydraulic supply enable of cut off condition of the friction element (C-2) is achieved with hydraulic pressure to certain friction element, the hydraulic pressure speed to the friction element (C-2) changes due to hydraulic supply speed to the certain friction element.

In other various exemplary aspects, the control apparatus further comprises a fifth valve (69) for switching hydraulic pressure supply or cut-off to the hydraulic servo (83) which operates the fourth friction element (C-3) to be engaged during the time of the third forward speed (3 speed) with hydraulic pressure, as signal pressure, for the hydraulic servo (84) which operates the friction element (B-1) to be engaged during the time of the predetermined forward speed (2, 6 speed), a sixth valve (68) for switching hydraulic pressure supply or cut-off to the hydraulic servo (84) which operates the friction element to be engaged during the time of the predetermined forward speed (3 speed) with hydraulic pressure, as signal pressure, for the hydraulic servo (83) which operates the fiction element to be engaged during the time of the third forward speed (3 speed), and a seventh valve (66, 67) for switching hydraulic pressure supply or cut-off to the friction element which is to be engaged during the time of the predetermined forward speed or the fourth friction element with hydraulic pressure, as signal pressure (SLC 3, SLB 1), for the fourth friction element (C-3) or the friction element (B-1) to be engaged during predetermined forward speed time.

In the above-described composition, interlocking of the friction element (B-1) which engages at the time of predetermined forward speed and the friction element (C-3) which engages at the time of the third forward speed is prevented without fail by switching of the fifth through seventh valves.

In various other exemplary aspects, the control apparatus further comprises an eighth valve (66) capable of selective supply or cut-off of signal pressure to the sixth valve (68), and application of signal pressure to the sixth valve (68) and the seventh valve (67) is cut-off by applying to the eighth valve, as signal pressure, hydraulic pressure for the hydraulic servo (84) which operates the friction element (B-1) to be engaged during the predetermined forward speed time and hydraulic pressure for the first hydraulic servo (82) which is operated by the signal pressure generation means (SOL 1).

In the above-described composition, hydraulic pressure is not supplied to the first hydraulic servo (82) during re-starting. Hence, the eighth valve does not operate, resulting in release of the friction element (B-1) which is engaged during the time of predetermined forward speed (6 speed) due to cutting off of the sixth valve, enabling engagement of the third friction element (C-3).

In various other exemplary aspects, the control apparatus further comprises a ninth valve (67) capable of selective supply or cut-off of signal pressure to the fifth valve (69), and application of signal pressure to the fifth valve (69) and the seventh valve (66) is cut-off by applying to the ninth valve (67) hydraulic pressure for the hydraulic servo (83) which operates the fourth friction element (C-3).

In the above-described composition, hydraulic pressure is not supplied to the fourth hydraulic servo (83) during re-starting, hence, the eighth valve does not operate, resulting in release of the friction element (C-1) which is engaged during the time of third forward speed (3 speed) due to cutting off of the fifth valve, enabling engagement of the friction element (B-1) which is engaged during the time of predetermined forward speed.

In various other exemplary aspects, the control means comprises a pressure adjustment valve and a solenoid valve which enables, by applying signal pressure to the pressure adjustment valve, supply of hydraulic pressure from the pressure adjustment valve to the hydraulic servo which operates the friction element, and the hydraulic pressure for the hydraulic servo which operates the friction element to be applied to the fifth valve (69) and the sixth valve (68) is the hydraulic pressure from the solenoid valve.

In the above-described composition, tie-up of both friction elements is prevented when occurrence of a failure during the second forward speed (2 speed) enables the third forward speed, namely, when the friction element (C-3) is engaged by releasing the friction element (B-1).

BRIEF DESCRIPTION OF THE DRAWINGS

Various exemplary embodiments of the invention will be described in detail, with reference to the following figures, wherein:

FIG. 2 is a chart describing the operation of the gear train through the hydraulic control apparatus of the first exemplary embodiment;

FIG. 9 is a comparative chart describing the operation of each valve in the hydraulic control apparatus, forward speeds and hydraulic supply/removal of hydraulic pressure of the hydraulic servo in the third exemplary embodiment;

FIG. 11 is a comparative chart describing the operation of each valve in the hydraulic control apparatus, forward speeds and hydraulic supply/removal of hydraulic pressure of the hydraulic servo in the fourth exemplary embodiment.

DETAILED DESCRIPTION OF EXEMPLARY EMBODIMENTS

Figure 1:
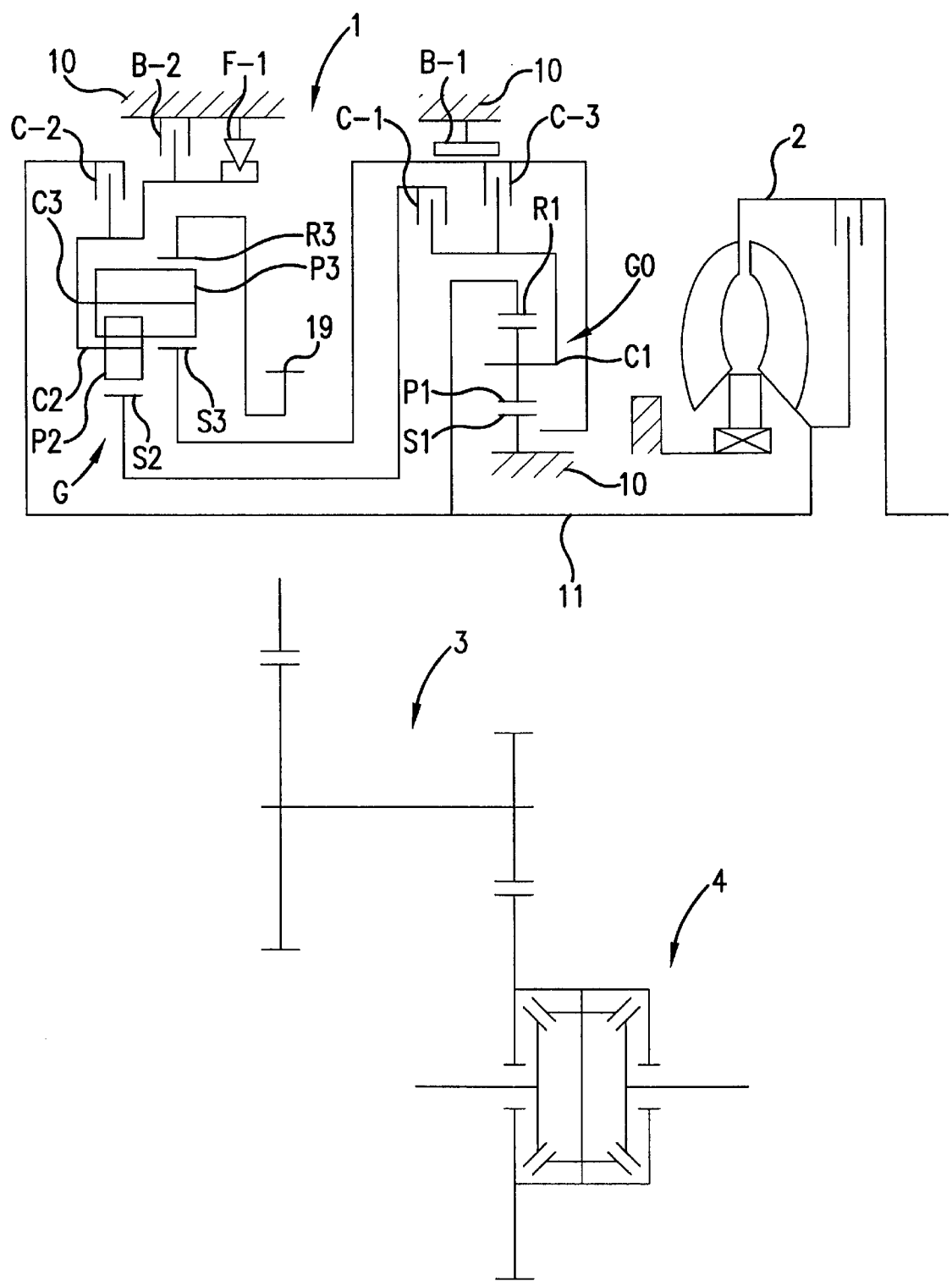
FIG. 1 is a schematic chart unfolding a gear train of 6-speed automatic transmission which is controlled by the hydraulic control apparatus of the first exemplary embodiment of the invention.

FIG. 1 illustrates a gear train of the first exemplary embodiment, in which the invention is applied to an automatic transmission with six forward speeds and one reverse speed, shown as a schematic unfolded in a common plane. As shown in FIG. 1, the automatic transmission is a transaxel type with three axles and a torque converter 2, with a lock-up clutch and a planetary gear transmission apparatus 1 installed on the first axle, a counter gear mechanism 3 is installed on the second axle, and a differential apparatus 4 installed on the third axle. The automatic transmission is connected to the engine (not shown) through the torque converter 2, which is installed on the front part of the power transmission path relative to the planetary gear transmission apparatus 1, and is further connected to the left and right wheel axle (not shown) through the counter gear mechanism 3 and the differential apparatus 4 which are installed on the back part of the power transmission path.

The planetary gear transmission apparatus 1 is composed of a Ravigneaux type planetary gear set G and reduction planetary gear G0 which inputs reducing rotation n to the planetary gear set G. The planetary gear set G is composed of a small-diameter sun gear S2, a large-diameter sun gear S3, a long pinion P3 which mates with the large-diameter sun gear S3, a short pinion P2 which mates with the small-diameter sun gear S2, and a ring gear R3 which mates with the long pinion P3. Moreover, the reduction planetary gear G0 is composed of a planetary gear with three elements; a sun gear S1, a pinion P1 which mates with the sun gear S1 and a carrier C1 which supports the pinion P1. Furthermore, a ring gear R1 mates the pinion P1.

The small-diameter sun gear S2 in the planetary gear set G is coupled with the carrier C1 in the reduction planetary gear G0 through the first clutch C-1 (hereafter C1 clutch), the large-diameter sun gear S3 is coupled with the same carrier C1 in the reduction planetary gear G0 through the third clutch C-3 (hereafter C3 clutch) and is made stoppable to a case 10 through the first brake B-1 (hereafter "B-1 brake"). Carriers C2, C3 are coupled with the input axle 11 through the second clutch C-2 (hereafter C2 clutch) and is made stoppable to the case 10 through the second brake B-2 (hereafter B2 brake), and the ring gear R3 is coupled with a counter drive gear 19 as an output element. Moreover, a one-way clutch F-1 is arranged parallel to the B2 brake. The reduction planetary gear G0 has the sun gear S1 anchored on the case 10, the carrier C1 coupled with the small-diameter sun gear S2 of the planetary gear set G through the C1 clutch C-1 and the carrier C1 coupled with the large-diameter sun gear S3 of the planetary gear set G through the C3 clutch C-3.

The clutch and brake of the planetary gear transmission apparatus 1 with the above structure is respectively provided with a friction engagement member and a hydraulic servo composed of a piston/cylinder mechanism which executes engagement/release operation for the member. The change in speed is achieved with the engagement and release of the friction engagement member by the supply and removal of hydraulic pressure for each hydraulic servo through the hydraulic pressure control apparatus which is arraigned to the case 10, based on the vehicle load within a range of a forward speed corresponding to the range selected by the driver under the control of the electronic control apparatus (not shown) and hydraulic control apparatus.

FIG. 2 illustrates, with a chart, the operation of each clutch and brake in the planetary gear transmission apparatus 1, each solenoid in the hydraulic apparatus and the relationship with forward speeds achieved by the operation. In FIG. 2, the relationship between each clutch and brake, the O-mark represents engagement during forward speed, A-mark represents engagement, during engine brake time, and no mark represents release. During the relationship between each solenoid valve and each forward speed, O-mark represents presence of current and X-mark represents absence of current.

The first speed (1st) in the gear train is achieved by automatic engagement of the one-way clutch F-1, which is equivalent to the engagement of the C1 clutch C-1 and the B2 brake B-2. In this case, as described in FIG. 1, the reduced rotation, through the reduction planetary gear G0, is input to the small-diameter sun gear S2 from the input axle 11 through the C1 clutch C-1, obtains reaction force from the carrier C2 which is stopped by the engagement of the one-way clutch F-1, and reduced rotation with the maximum gear ratio of the ring gear R3 is output to the counter drive gear 19.

The second speed (2nd) is achieved by the engagements of the C1 clutch C-1 with the B1 brake B-1. In this case, reduced rotation through the reduction planetary gear G0 is input in the small-diameter sun gear S2 form the input axle 11 through the C1 clutch C-1, obtains reaction force from the large-diameter sun gear S3 which is stopped by engagement with the B1 brake B-1, and the reduced rotation of the ring gear R3 is output to the counter drive gear 19. In this case, the reduction ratio becomes smaller than the first speed (1st).

The third speed (3rd) is achieved by the simultaneous engagement of the C1 clutch C-1 and the C3 clutch C-3. In this case, reduced rotation through the reduction planetary gear G0 is input simultaneously to the large-diameter sun gear 3 and the small-diameter sun gear S2 from the input axle 11 through the C1 clutch C-1 and the C3 clutch C-3, resulting in a direct coupling of the planetary gear set G. Hence, input rotation of both sun gears and the rotation of the ring gear R3 with the same speed is output to the counter drive gear 19 as reduced rotation with relative to the rotation of the input axle 11.

The fourth speed (4th) is achieved by the simultaneous engagement of the C1 clutch C-1 and the C2 clutch C-2. In this case, reduced rotation through the reduction planetary gear G0 is input to the sun gear S2 from the input axle 11 on one hand, and on the other hand, non-reduced rotation is input through the C2 clutch C-2 is input from the axle 11 to the carriers C2, C3, resulting in rotation with a medium speed between two input rotations output to the counter drive gear 19 as rotation of the ring gear R3 which is slightly reduced relative to the rotation of the input axle 11.

The fifth speed (5th) is achieved by the simultaneous engagement of the C2 clutch C-2 and the C3 clutch C-3. In this case, reduced rotation through the reduction planetary gear G0 is input to the sun gear S3 from the input axle 11 on one hand, and on the other hand, non-reduced rotation is input through the C2 clutch C-2 from the axle 11 to the carriers C2, C3, resulting in rotation whose speed is slightly increased over the rotation of the input axle of the ring gear R3 output to the counter drive gear 19.

The sixth speed (6th) is achieved through the engagement of the C2 clutch C-2 and the B1 brake B-1. In this case, the non-reduced rotation is input only to the carriers C2, C3 from the input axle 11 though C2 clutch C-2, and the rotation with further increased speed of the ring gear R3, which obtains reaction force from the sun gear S3 stopped by the engagement of the B1 brake B-1, is output to the counter drive gear 19.

Reverse speed (REV) is achieved by the engagement of the C3 clutch C-3 and the B2 brake B-2. In this case, reduced rotation through the reduction planetary gear G0 is input to the sun gear S3 from the input axe 11 through the C3 clutch C-3, and reverse rotation with the large gear ratio of the ring gear R3, which obtains a reaction force from the carrier C3 stopped by the engagement of B2 brake B-2, is output to the counter drive gear 19.

Figure 3:
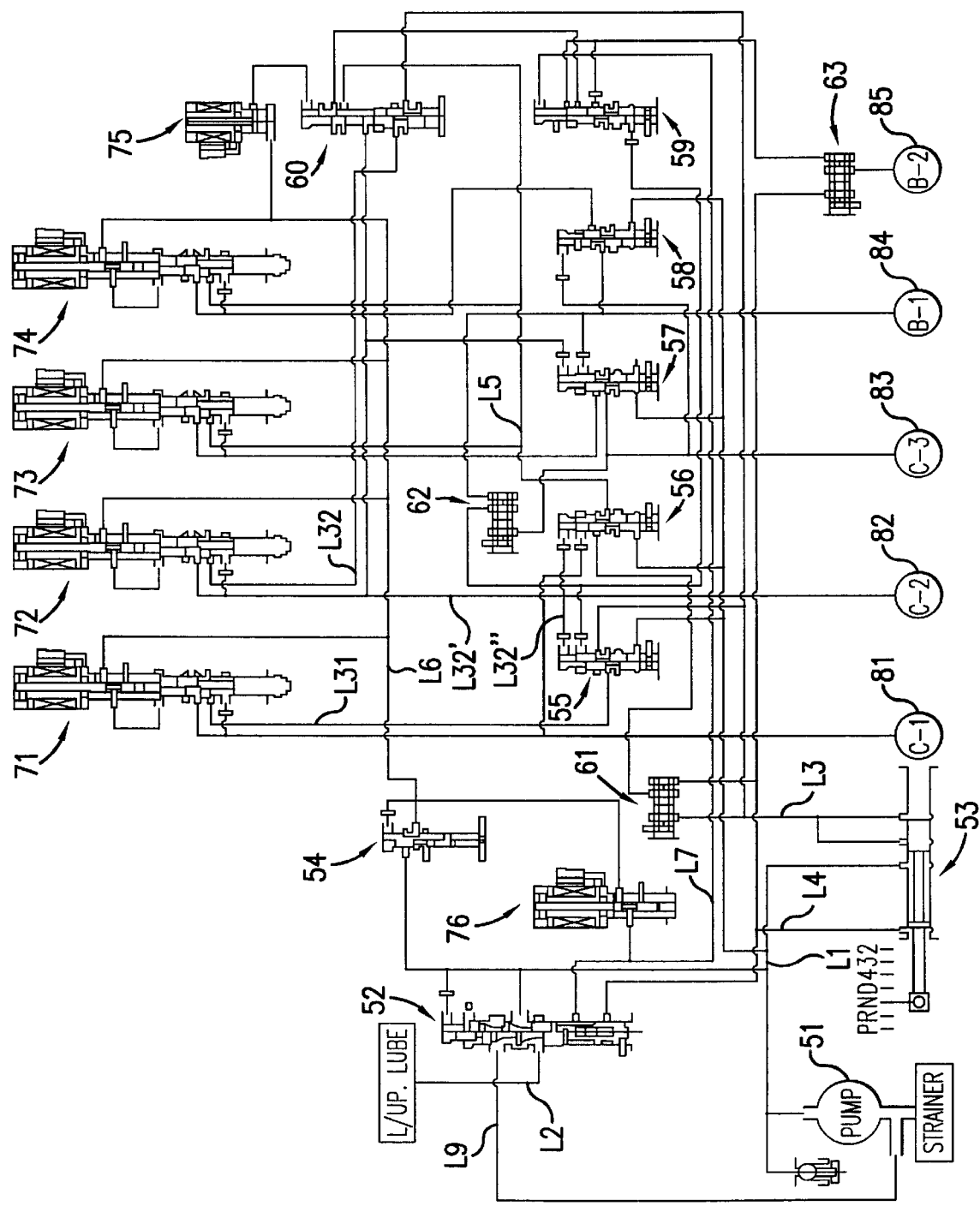
FIG. 3 is a circuit drawing of the hydraulic control apparatus of the first exemplary embodiment.

Next, an explanation is given of the hydraulic control apparatus to achieve various forward speeds described in the operation chart of FIG. 2 for the gear train shown in FIG. 1. FIG. 3 describes the hydraulic control apparatus. The hydraulic circuit is structured in such a manner that the hydraulic pressure, which is sucked up by an oil pump 51 as a hydraulic source and which is emitted into the line pressure hydraulic path L1, is adjusted while exhausting in the secondary pressure hydraulic path L2 and in the drain hydraulic path L9 by the primary regulator valve 52 to create suitable line pressure corresponding to the running load of the vehicle. The supply and removal of hydraulic pressure to a hydraulic servo 81–85 of each friction element is executed by controlling the pressure and direction by each valve in the circuit, using the line pressure as a reference control pressure.

A description will be given of each valve which composes the circuit and the relationship with the hydraulic path connection. First, the primary regulator 52 comprises a spool with a spring load and an adjustment valve with a plunger abutting the spring load side spool edge. The primary regulator valve 52 comprises an input port connected to the line pressure hydraulic path L1, an output port leading to the secondary pressure hydraulic path L2, and a drain port leading to the suction side of the oil pump through a drain hydraulic path L9. Direct feedback pressure of the line pressure, opposing the spring force is applied, through an orifice, to the spool which controls the communication of these ports. Moreover, a throttle pressure output by a throttle solenoid valve in the direction of a superimposing spring force is also applied as a signal pressure. During optimum line pressure time, the primary regulator valve 52 minimizes the communication to the drain port and supplies the excess pressure mainly to the secondary pressure hydraulic path L2, but when an applied signal pressure becomes large, the valve increase the communication to the drain port to increase the drain amount and to maintain the line pressure of the line pressure hydraulic path L1 at a predetermined level.

The line pressure hydraulic path L1 is connected, at one end, to a modulator valve 54 which supplies reference pressure for the generation of solenoid signal pressure to the solenoid valves 71–75 through a hydraulic path L6, and is connected, at the other end, to a respective spool edge side pressure receptor of a C1 release valve 55, a B1–C3 release valve 56, a C3 release valve 57 and a B1 release valve 58.

Next, the manual valve 53 is a spool valve with seven positions which are switched by the shift lever operation of the vehicle driver. In fact, the manual valve 53 has a "P" position which, using spool operations, closes the input port connected to the line pressure hydraulic path L1, an "R" position which communicates the input port with the R-range output port and drains other output ports, an "N" position which closes the input port against all the output ports, "D", "4" and "3" positions which communicate the input port to the D-range output port, drains R-range output port and closes the second D-range output port, and a "2" position which communicates the input port with both the D-range output port and second D-range port, and drains R-range output port. D-range output port of the valve is connected, through a D-range hydraulic path L3, to input ports of the C1 release valve 55 and the C2/B2 supply relay valve 60, and is further connected to one of the input ports of the shuttle valve 61, whose output port is connected to the input port of B1/C3 release valve 56. Moreover, the R-range output port is connected, through a R-range hydraulic path L4, to the other input port of the shuttle valve 61 and one of input ports of the shuttle valve 63, in the supply hydraulic path of the B2 hydraulic servo 85, and is further connected to the reverse signal pressure port which leads to the plunger edge side pressure receptor of the primary regulator valve 52.

The supply path for the C1 clutch hydraulic servo 81 is connected to the D-range hydraulic path L3 through a C1 solenoid valve (SL C1) 71 and the C1 release valve 55. Furthermore, the C1 solenoid valve 71, which adjusts pressure based on the signal from the electronic control apparatus, is provided on the downstream side of the C1 release valve 55 on the supply path. The C1 solenoid valve 71 is structured as a combination of a spool valve part, as 3-port type adjustment valve, which controls with the spring loaded spool the communication between the input/output ports and the drain ports, and a linear solenoid valve part as 3-port type solenoid valve. The linear solenoid valve port applies solenoid pressure to the anti-spring load edge side of the spool and, at the same time, to the applied solenoid load and spring load. Moreover, the input port of the linear solenoid valve part is connected, through the modulator pressure hydraulic path L6, to the output port of the solenoid modulator valve 54, and the output port is connected to the signal pressure port of the spool valve port. The input port of the spool valve of the C1 solenoid valve is connected to the output port of the C1 release valve 55, the output port is connected to the C1 clutch hydraulic servo 81, and the feedback port leading to the spool edge of the spring load side is connected to the downstream side hydraulic path of the output through the orifice.

The supply path for the C2 clutch hydraulic servo 82 is connected to the D-range hydraulic path L3 through the C2/B2 supply relay valve 60. The C2 solenoid valve (SL C2) 72, which adjusts pressure based on the signal from the electronic control apparatus, is provided on the downstream side of the C2/B2 supply relay valve 60 on the supply path. The C2 solenoid valve 72 is also structured as a combination of a 3-port type spool valve part which controls, with the spring loaded spool, the communicability between the input/output ports and the drain ports, and a 3-port type linear solenoid valve part which applies solenoid pressure to the anti-spring load edge side of the spool and, at the same time, to which solenoid load and spring load are applied. Moreover, the input port of the linear solenoid valve port is connected, through the modulator pressure hydraulic path L6, to the output port of the solenoid modulator valve 54, and the output port is connected to the signal pressure port of the spool valve part. The input port of the spool valve is connected to the output port of C2/B2 supply relay valve 60, the output port is connected to the C2 clutch hydraulic servo 82, and the feedback port leading to the spool edge of the spring load side is connected to the downstream side hydraulic path of the output through the orifice. In this supply path, the downstream hydraulic path of the output port is further connected to the spool edge side signal pressure port of C2/B2 supply relay valve 60 and to the spring load side spool edge signal pressure port of the C3 release valve 57, the C1 release valve 55 and the B1/C3 release valve 56 through the hydraulic path L32".

The supply path for the C3 clutch hydraulic servo 83 is structured such that the C3 solenoid valve (SL C3) 73, which adjusts the pressure based on the signal from the electronic control apparatus, is provided on the downstream side of the supply path of the hydraulic path L5, which is connected to the D-range hydraulic path L3 and to the R-range hydraulic pressure L4 through the B1/C3 release valve 56 and the shuttle valve 61. The C3 solenoid valve 73 also is structured as a combination of a 3-port type spool valve part which controls, with the spring loaded spool, the communication between the input/output ports and the drain ports, and a 3-port type linear solenoid valve part which applies solenoid pressure to the anti-spring load edge side of the spool and, at the same time, to which solenoid load and spring load are applied. Moreover, the input port of the linear solenoid valve part is connected, through the modulator pressure hydraulic path L6, to the output port of the solenoid modulator valve 54, and the output port is connected to the signal pressure port of the spool valve port. The input port of the spool valve is connected to the hydraulic path L5, the output port is connected to the input port of the C3 release valve 57, and the feedback port leading to the spool edge of the spring load side is connected to the downstream side hydraulic path of the output through the orifice. In this supply path, the C3 clutch hydraulic servo 83 is connected to the output port of the C3 release valve 57.

The supply path for the B1 brake hydraulic servo 84 is structured such that the B1 solenoid valve (SL B1) 74, which adjusts pressure based on the signal from the electronic control apparatus, is provided on the downstream side of supply path of the hydraulic path L5. In this case also, the B1 solenoid valve 74 is structured as a combination of a 3-port type spool valve part which controls, with a spring loaded spool, the communicability between the input/output ports and the drain ports, and a 3-port type linear solenoid valve part which applies solenoid pressure to the anti-spring load edge side of the spool and, at the same time, to which the solenoid load and the spring load are applied. Moreover, the input port of the linear solenoid valve part is connected, through the modulator pressure hydraulic path L6, to the output port of the solenoid modulator valve 54, and the output port is connected to the signal pressure port of the spool valve port. The input port of the spool valve is connected to the hydraulic path L5, the output port is connected to the input port of the B1 release valve 58, and the feedback port leading to the spool edge of the spring load side is connected to the downstream side hydraulic path of the output through the orifice. In this supply path, the B1 brake hydraulic servo 84 is connected to the output port of the B1 release valve 58.

The supply path for the B2 brake hydraulic servo 85, unlike the other supply paths, is made to be 2-system supply path. One supply path is made of a hydraulic path which is connected to the R-range hydraulic path L4 through the shuttle valve 63, while the other supply path is made to be a supply path from the hydraulic path L5 and is structured in such a manner that the C2/B2 supply relay valve 60 and the B2 control valve 59 are provided in series on the hydraulic path, and the shuttle valve is included downstream of the path. In this supply path, the solenoid valve 75 which controls the C2/B2 supply relay valve 60 is a permanently closed type 3-port ON/OFF valve which opens and shuts input/output ports and drain port with spring loaded balls. Moreover, the C2/B2 supply relay valve 60 is made to be a 6-port switch valve which switches the respective input/output port and the drain port with two spools. Moreover, the input port of the solenoid valve 75 is connected to the modulator pressure hydraulic path L6 and the output port is connected to the signal pressure port which leads to one spool edge of the C2/B2 supply relay valve 60. One of the input ports of the C2/B2 supply valve 60 is connected to the D-range hydraulic path L3, and the corresponding output port is connected to the input port of the C2 solenoid valve 72, while the other input port is connected to the hydraulic path L5 with the corresponding output port connected to the input port of the B2 control valve 59.

Each of the release valves 55–57 include a similar spool type 3-port switching valve, and is structured in such a manner that the two step differential diameter pressure receiving surface is formed by shrinking the spool spring load side edge. All the signal pressure ports leading to the anti-spring load side spool edge of the release valves 55–57 are connected to the line pressure hydraulic path L1.

The input port of the C1 release valve 55 is connected to the D-range hydraulic path L3 and the output port is connected to the input port of C1 solenoid valve 71. The input port of the signal pressure port leading to the differential diameter receptor is connected, through an orifice, to the output port of the shuttle valve 62 which is connected to the supply path of the C3 clutch hydraulic servo 83 and to the supply path of the B1 brake hydraulic servo 84 while the signal pressure port leading to the receptor of the spring load side spool edge is connected, through an orifice, to the supply path of the C2 clutch hydraulic servo 82.

The input port of B1/C3 release valve 56 is connected to the output port of the shuttle valve 61 and the output port is connected to the hydraulic path L5. The signal pressure port leading to the differential diameter receptor is connected, through the orifice, to the supply path of the C1 clutch hydraulic servo 81, and the signal pressure port leading to the spring load side spool edge receptor is connected, through the orifice, to the supply path of the C2 clutch hydraulic servo 82.

The input port of the C3 release valve 57 is connected to the output port side of the C3 solenoid valve 73 and the output port is connected to one of input ports of C3 clutch hydraulic servo 83 and the shuttle valve 62. The signal pressure port leading to the differential diameter receptor is connected, through the orifice, to the supply path of the B1 brake hydraulic servo 84 and the signal pressure port leading to the spring load side spool edge receptor is connected, through the orifice, to the supply path of the C2 clutch hydraulic servo 82.

The B1 release valve 58 is made to be spool type 3-port switch valve. The signal pressure port leading to the anti-spring load side spool edge of the release valve 58 is also connected to the line pressure hydraulic path L1. The input port of the valve is connected to the output port of the B1 solenoid valve 74, and the output valve is connected to the other input ports of the B1 brake hydraulic servo 84 and the shuttle valve 62. Moreover, the signal pressure port leading to the spring load side spool edge is connected, through the orifice, to the supply path of C3 clutch hydraulic servo 83.

The B2 control valve 59 is made to be a spool type 3-port switch valve which has a plunger with different diameters as loading means. The input port of the valve is connected to the other output port of C2/B2 supply relay valve 60, and the output port is connected to the other input port of the shuttle valve 63. Moreover, the signal pressure port leading to the larger diameter side receptor of the plunger is connected to the output port of the shuttle valve 62, whose input port is connected to the supply path of the C3 clutch hydraulic servo 83 and to the supply path of the B1 brake hydraulic servo 84, while the signal pressure port leading to the receptor in the abutting side of the plunger and the spool is connected, through orifice, to the downstream side of the output port and the signal pressure port leading to the spool edge receptor is connected to the throttle pressure hydraulic path L7.

Figure 4:
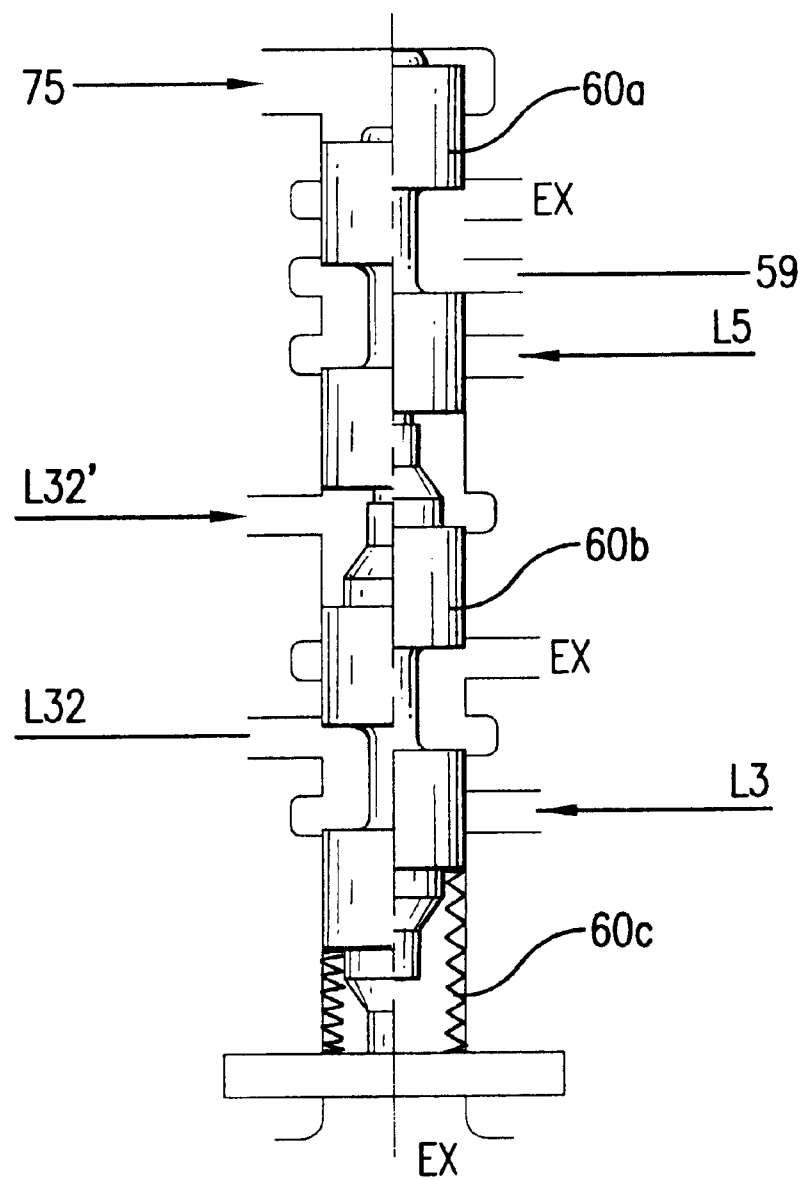
FIG. 4 is an enlargement of C2/B2 supply relay valve in the hydraulic control apparatus of the first exemplary embodiment.

As enlarged in FIG. 4, C2/B2 supply relay valve 60 is made to be a switching valve composed of two spools 60*a* and 60*b*, which are of same diameter, with land at both edges, and a spring 60*c* which is abutted to one of the edges of the spool 60*b*. This valve is composed of one valve part containing an input port which is opened or shut by the bottom edge land of the spool 60*b*, as shown in the lower section of FIG. 4 and which is connected to D-range hydraulic path L3. The valve 60 also includes a drain port which is opened or shut by the top edge of the spool 60*b*, and an output port, which is arranged between the two ports, communicated with either the input port or the drain port between both lands of the spool 60*b*, and is connected to the hydraulic path L32, of the other valve part containing an input port which is opened or shut by the bottom edge land of the spool 60*a*, as shown in the lower section of FIG. 4 and which is connected to hydraulic path L5. The valve 60 also includes a drain port, which is opened or shut by the top edge of the spool 60*a*, and an output port which is arranged between the two ports, communicated with either the input port or the drain port between both lands of the spool 60*a*, and is connected to the input port of B2 control valve 59. Moreover, a signal pressure port connected to the hydraulic path L32' extending downstream of the hydraulic path L32 is provided in the abutting section of both spools, and a signal port to which solenoid pressure of the solenoid valve 75 is applied is formed at the edge side receptor of the spool 60*a*.

In the hydraulic circuit with above structure, during the "N" position of the manual valve 53, the input port connecting to the line pressure hydraulic path L1 is shut by the land and all the output ports are drained. Hence, a module pressure which is adjusted by the solenoid modulator valve 54 leading to the direct line pressure hydraulic path L1 is output to the modulator hydraulic path L6, but signals of each of solenoid valves 71–74 are turned on, while signals of solenoid valve 75 is turned off. Moreover, the input port of each of solenoid valves 71–74 is in a drain state and hydraulic pressure is not supplied, and the solenoid valve 75 is in the state where the input port and the output valve are cut off. Hence, applied pressure output from these solenoid valves 71–74 and the application of the solenoid pressure from the solenoid valve 75 does not occur. Moreover, a line pressure is applied to the spool edge side signal pressure port of each of the valves 55–58 which are connected to the line pressure hydraulic path L1. Hence, each of these valves are switched, against a spring force, to upper positions as shown in FIG. 3. Moreover, the B2 control valve 59 is located on the right side, as shown in FIG. 3, due to the application of the throttle pressure of the throttle pressure hydraulic path L7, and the C2/B2 supply relay valve 60 is located at the right side of FIG. 3. This communication relation is the same for the "P" position of the manual vale 53, though the spool position is different.

When the manual valve 53 is changed to the "D" position, the line pressure is output also to the D-range hydraulic path L3, causing hydraulic pressure of the D-range hydraulic path L3 to be supplied to each input port of each solenoid valve 71, 73, 74, except for the C2 solenoid valve 72, and the C2/B2 supply relay valve 60. The hydraulic pressure of the D-range hydraulic path L3 through the C1 release valve 55, which is in the communication state at the right side, as shown in FIG. 3, is supplied to the input port of C1 solenoid valve 71 on the hydraulic path L31. Hydraulic pressure of the D-range hydraulic path L3 through the B1/C3 release valve 56 from the shaft valve 61 is supplied to the input port of the C3 solenoid valve 73 and B1 solenoid valve 74 on the hydraulic path L5, and the hydraulic pressure of the above two systems is supplied to the two input ports of C2/B2 supply relay valve 60. Here, for the hydraulic path L32 to the input port of C2 solenoid valve 72, the solenoid pressure to the receptor at the edge side of the spool valve 60a of the C2/B2 supply relay valve 60 is not applied due to the off signal from the solenoid valve 75. Moreover, hydraulic pressure from the hydraulic path L32' to the abutting section of both spools is also not applied. Hence, the hydraulic pressure supply condition is not enabled with the drain at the right side of FIG. 3 energized by the force of the spring 60c.

Next, the valve operation during normal time will be described. Upon turning the signals off to the C1 solenoid valve 71 to achieve the first speed, the line pressure of the D-range hydraulic path L3, which is supplied as far as the C1 solenoid valve 71, is adjusted by the valve 71 to apply pressure and is supplied to the C1 clutch C-1 hydraulic servo 81. As a result, the C1 clutch C-1 is engaged and the first speed is achieved through the cooperation of the one-way clutch F-1. At this time, applied pressure to C1 clutch C-1 is applied, through the orifice, to the differential diameter receptor part of the B1/C3 release valve 56, but due to the valve receptor relationship, switching of the B1/C3 release valve 56 does not occur, and the above hydraulic pressure supply relationship is maintained. Moreover, because the C2/B2 supply relay valve 60 is located at the right side of FIG. 3, connection between the C2 solenoid valve 72 and the D-range hydraulic path L3 is mechanically cut off.

The second speed is achieved by turning the signal off to the C1 solenoid valve 71 and the B1 solenoid valve 74. In this state, in addition to applying pressure to the supply state to the C1 clutch hydraulic servo 81, the B1 solenoid valve 74 enters a pressure adjustment state, and adjusted applied pressure is supplied to the B1 brake hydraulic servo 84 through the B1 release valve 58, which is located at the left side of FIG. 3, due to the application of the line pressure. As a result, the second speed is achieved through the engagement of the C1 clutch and reaction force support of the B1 brake. Here in this state, pressure for the B1 brake is applied, through the orifice, to the differential diameter pressure receptor of the C3 release valve 57, and the applied pressure through the shuttle valve 62 is also applied to the differential diameter pressure receptor of the C1 release valve 55 and to the plunger edge pressure receptor of the B2 control valve 59, but due to the pressure balance, the C1 release valve switch does not occur. Moreover, the B2 control valve 59, due to the relationship with the throttle pressure at the spool edge side, starts-up when applied pressure to the B1 brake rises to the designated pressure, which is substantially lower than the line pressure, thus, mechanically cutting off of the connection between the input port of the B2 control valve 59 and the B2 hydraulic servo 85. However, due to the absence of the hydraulic pressure supply to the input port, a relationship with the other valves does not occur. Moreover, the C2/B2 supply relay valve 60, because it is located at right side of FIG. 3, mechanically cuts off the connection between the C2 solenoid valve 72 and the D-range hydraulic path L3.

The third speed is achieved by turning off the signal to the C1 solenoid valve 71 and the C3 solenoid valve 73. In this case, while applying the pressure supply state to the C1 clutch hydraulic servo 81 remains unchanged, the C3 solenoid valve 73 enters the pressure adjustment state, and the applied pressure is supplied to the C3 clutch hydraulic servo 83 through the C3 release valve 57, which is located right side of FIG. 3. As a result, the third speed is achieved through the simultaneous engagement of the C1 clutch and the C3 clutch. Moreover, the applied pressure for the C3 clutch hydraulic servo 83 is applied to the spring load side receptor, to the plunger edge receptor of the B2 control valve 59, through the shuttle valve 62, and to the differential diameter pressure receptor of C1 release valve 55. Moreover, when the applied pressure rises to the designated pressure, which is lower than the line pressure, the B2 control valve 59 is switched to the left side location of FIG. 3, and when the applied pressure rises to the line pressure, the B1 release valve 58 is switched to right side location of FIG. 3, thus mechanically cutting off the connection between the input port of the B2 control valve 59 and the B2 hydraulic servo 85. Moreover, the C2/B2 supply relay valve 60, because it is located at right side in the figure, mechanically cuts off the connection between the C2 solenoid valve 72 and the D-range hydraulic path L3.

The fourth speed is achieved by turning off the signal to the C1 solenoid valve 71, and the C2 solenoid valve 72, and turning on the signal to the solenoid valve (SL1) 75. In this state, while the applied pressure to the C1 clutch hydraulic servo 81 remains unchanged, the hydraulic pressure output by the solenoid valve 75 is applied to the anti-spring load side spool edge receptor of the C2/B2 supply relay valve 60. Thus causing the valve 60 to switch to the left side location of FIG. 4. Hence hydraulic pressure of the D-range hydraulic path L3 is output to the C2 solenoid valve 72 through the hydraulic path L32. As a result, the C2 solenoid valve 72 becomes the applied pressure adjustment state, and the applied pressure is supplied to the C2 clutch hydraulic servo 82. The applied pressure, on one hand, is applied to the spring load edge side receptor of the C1 release valve 55, while the applied pressure to the spring load edge side receptor of the B1/C3 release valve 56 and to the spring load side receptor of C3 release valve 57, and further to the in-between spool receptor of the C2/B2 supply relay valve 60. As a result, when the applied pressure rises to the line pressure, the B1/C3 release valve 56 switches to the left side location of FIG. 3. Thus, mechanically cutting off the connection between the D-range hydraulic path L3, the B1 solenoid valve 74 and the C3 solenoid valve 73. Moreover, the spool 60b of the C2/B2 supply relay valve 60 in lower section of FIG. 4 is maintained, without failure, at the left side of FIG. 3. Once the maintenance state is established, the on-signal of the solenoid valve 75, is turned off at the appropriate time. The signals to the solenoid valve 75 is made only during the speed change, and is off during the normal state after completion of the speed change. In this manner, the fourth speed is achieved through simultaneous engagement of the C1 clutch C-1 and the C2 clutch C-2.

The fifth speed is achieved by turning off the signal to the C2 solenoid valve (SLC2) 72 and the C3 solenoid valve (SLC3) 73 and turning on the signal to the solenoid valve (SL1) 75. In this state, the applied pressure for the C2 clutch hydraulic servo 82 is applied similarly as the corresponding valve found in the fourth speed, and the applied pressure for the C3 hydraulic servo 83 is applied similarly as the corresponding valve found in the third speed. Due to the combination of the hydraulic pressure application, both of the applied pressures are applied to the differential diameter receptor part and to the spring load side receptor of the C1 release valve 55, and when these hydraulic pressures rise to the line pressure, the C1 release valve 55 switches to the left side position of FIG. 3, mechanically cutting off the connection between the C1 solenoid valve 71 and the D-range hydraulic path L3. However, this operation does not relate to the operations of the other valves. As a result, the fifth speed is achieved through the simultaneous engagement of the C2 clutch C-2 and the C3 clutch C-3.

The sixth speed is achieved by turning off the signal to the C2 solenoid valve 72 and the B1 solenoid valve 74 and turning on the signal to the solenoid valve (SL1) 75. In this state, the operation by the hydraulic pressure output by the solenoid valve (SL1) 75 is similar to the operations of the fourth and fifth speed. Moreover, the applied pressure for the B1 brake hydraulic servo 84 is applied similarly to the corresponding valve as in the second speed. In this case, both of the applied pressures are applied to the differential diameter receptor part and to the spring load side receptor of the C3 release valve 57, and when these hydraulic pressures rise to the line pressure, the C3 release valve 57 switches to the left side position of FIG. 3, mechanically cutting off the connection between the C3 solenoid valve 73 and the C3 clutch hydraulic servo 83. Moreover, both of the applied pressures are also applied to the differential diameter receptor part and to the spring load side receptor of the C1 release valve 55, and when these hydraulic pressures rise to the line pressure, the C1 release valve 55 switches to the left side position of FIG. 3, mechanically cutting off the connection between the C1 solenoid valve 71 and the D-range hydraulic path L3. However, this operation does not relate to the operations of other valves. As a result, the sixth speed is achieved through the engagement of the C2 clutch C-2 and the B1 brake B-1 reaction force support.

The reverse speed is achieved by switching the position of the manual valve 53 to the "R" position and by turning off the signals to the C3 solenoid valve 73. In this case, the D-range hydraulic path L3 is drained, but the line pressure is output to the R-range hydraulic path L4, with the hydraulic pressure directly supplied to the B2 brake hydraulic servo 85 through the shuttle valve 63. Meanwhile, the line pressure of the R-range hydraulic path L4 is supplied also to the input port of the B1/C3 release valve 56 through the shuttle valve 61, which hydraulic pressure is supplied to the C3 solenoid valve 73 through the B1/C3 release valve 56 located at the right side position of FIG. 3, by permanently applied line pressure and to the C3 clutch hydraulic servo 83 through the C3 release valve 57 located at the right side position of FIG. 3 from the C3 solenoid valve 73 which is in the applied pressure output state due to the off-signal by permanently applied line pressure. As a result, the reverse speed is achieved through the engagement of the C3 clutch C-3 and the B2 brake B-2 reaction force support.

A description will be given concerning the operation of the hydraulic control apparatus, during a failure under a normal condition. Regardless of the achieved forward speed, each of the permanently open solenoid valves 71–74 is in a pressure supply state, while the permanently closed solenoid valve 75 is in a solenoid pressure cut-off state. During the first speed, the C2 solenoid valve 72 does not apply a pressure output state as the input port is in a drain state through the C2/B2 supply relay valve 60, but the other two valves, the C3 solenoid valve 73 and the B1 solenoid valve 74 applies a pressure output state. As a result, the applied pressure of the C3 solenoid valve 73 is supplied to the C3 clutch hydraulic servo 83 through the C3 release valve 57 and the applied pressure of the B1 solenoid valve 74 is supplied to the B1 brake servo 84 through the B1 release valve 58. However, the B1 release valve 58, due to the application of the applied pressure for the C3 clutch hydraulic servo 83 to the spring load side spool edge through the orifice, switches to the right side position of FIG. 3 against the application of the line pressure, thus cutting off the applied pressure and switching the B1 brake hydraulic servo 84 to an open state. Here, the supply path to the B2 hydraulic servo 85, due to the permanently closed solenoid valve 75 not changing against the normal state, remains in the cut-off state and does not apply a pressure supply state because the path is drained by the C2/B2 supply relay valve 60. Hence, during the first speed failure, the apparatus is shifted upwards to the third speed achievement state in which the C1 clutch C-1 and the C3 clutch C-3 engage simultaneously.

During the second speed, the B1 brake hydraulic servo 84 initially applies a pressure supply state under the operation of the B1 solenoid valve 74, but when the failure state occurs, due to the C3 solenoid valve 73 assuming an applied pressure supply state, the B1 brake hydraulic servo 84 ultimately assumes a similar hydraulic pressure supply state similar to the first speed failure. Hence, the applied pressure of the B1 solenoid valve 74, which is supplied to the B1 brake hydraulic servo 84 through the B1 release valve 58, is cut off by the B1 release valve 58 which switches to the right side of FIG. 3 due to the application of the applied pressure for the C3 clutch hydraulic servo 83 to the spring load side spool edge through the orifice. Hence, during the second speed failure also, the apparatus is shifted upwards to the third speed achievement state in which the C1 clutch C-1 and the C3 clutch C-3 engage simultaneously.

During the third speed, the applied pressure for the C3 clutch hydraulic servo 83 exists from the beginning, hence, change does not occur against the normal time hydraulic pressure supply, even during failure time, due to the B1 release valve 58 in the drain communication state in which the applied pressure for the B1 brake hydraulic servo 84 on the right hand of FIG. 3 is cut off. Hence, during the third speed failure time, simultaneous engagement of the C1 clutch C-1 and the C3 clutch C-3 is kept unchanged and the third speed achievement state is maintained.

During the fourth speed, the applied pressure supply state for the C1 clutch hydraulic servo 81 and the C2 clutch hydraulic servo 82 exists at the beginning, and the input ports of the other two solenoid valves, the C3 solenoid valve 73 and the B1 solenoid valve 74 are in a drain communication state due to the hydraulic path L5 being cut off by the B1/C3 release valve 56, and the applied pressure is not output even when these two valves assume an off signal state during failure. Moreover, signals to the solenoid valve 75 is turned off due to failure, but it does not affect the operation of the C2/B2 supply relay valve 60 because the signals to the valve 75 is off during normal state, as described above. In the circuit, the spool 60b of the C2/B2 supply relay valve 60 in the lower section of FIG. 4 is self-maintained at the right side of FIG. 3 due to the applied pressure for the C2 clutch hydraulic servo 82. Hence, the supply of applied pressure to the C2 clutch hydraulic servo 82 from the C2 solenoid valve 72 is maintained. Moreover, because the supply path leading to the B2 brake hydraulic servo 85 through the valve 60 is similarly in the drain communication state in which the hydraulic path L5 is cut off by the B1/C3 release valve 56, the drain communication state of the B2 brake hydraulic servo 85 does not change. Hence, during the fourth speed failure time, the supply state of the applied pressure for the C1 clutch hydraulic servo 81 and the C2 clutch hydraulic servo 82 from the beginning is kept unchanged and the fourth speed achievement state is maintained.

During the fifth speed achievement time, the C2 clutch hydraulic servo 82 and the C3 clutch hydraulic servo 83 are in the applied pressure supply state. Because the hydraulic pressure supply to the C1 solenoid valve 71 is cut off due to the superimposed application of the C2 clutch C-2 applied pressure and the C3 clutch C-3 applied pressure for the C1 release valve 55, supply of applied pressure to the C1 clutch servo 81 is not achieved even if the C1 solenoid valve 71 assumes the control state due to the off signal caused by the failure. Similarly, the supply path for the B1 brake hydraulic servo 84 is cut off by the B1 release valve 58 to which the C3 clutch applied pressure is applied, the applied pressure to the B1 brake hydraulic servo 84 is not achieved even if the B1 solenoid valve 74 assumes the adjustment state due to the off signal caused by the failure. In this case, the state of the C2/B2 supply relay valve 60 caused by the off signal for the solenoid valve 75 is the same as the fourth speed failure time. Hence, the engagement state of the C2 clutch C-2 and the C3 clutch C-3 does not change in the fifth speed failure time as well, and the fifth speed achievement state is maintained.

During the sixth speed achievement time, the C2 clutch hydraulic servo 82 and the B1 brake hydraulic servo 84 are in the applied pressure supply state to begin with, and the supply path L31 to the C1 solenoid valve 71 is cut off by the C1 release valve 55. Hence, supply of the applied pressure to the C1 clutch hydraulic servo 81 is not achieved even if the C1 solenoid valve 71 assumes the control state due to the off signal caused by the failure. Moreover, because of superimposed application of the C2 clutch, applied pressure and the B1 brake B-1 applied pressure, the supply path to the C3 clutch hydraulic servo 83 from the C3 solenoid valve 73 is cut off by the C3 release valve 57 at the left side position of FIG. 3. Thus, the supply of the applied pressure to the C3 clutch hydraulic servo 83 is not achieved even if the C3 solenoid valve 73 assumes the adjustment state with the off-signal caused by the failure. In this case, the state of the C2/B2 supply relay valve 60 caused by the off-signal to the solenoid valve 75 is the same as in the case of fourth speed failure. As a result, the engagement of the C2 clutch C-2 and the B1 brake B-1 is maintained and the sixth speed achievement state is kept unchanged.

Here, during the reverse speed achievement time, supply of the line pressure to the D-range hydraulic path L3 from the manual valve 53 cease to exist, thus maintaining the reverse speed regardless of the failure of each solenoid valve.

Furthermore, in the circuit structure, switching to the "D" position is executed once again after the hydraulic pressure of the D-range hydraulic path L3 is drained due to the drop in pressure caused by switching the position of the manual valve 53 or by stopping the oil pump caused by turning off the engine. All three solenoid valves 71, 73 and 74, except for the C2 solenoid valve 72 whose communication to the D-range hydraulic path L3 is cut off by the C2/B2 supply relay valve 60 due to the off-signal of the solenoid valve 75, are ready to output the applied pressure. However, the hydraulic path communication similar to a failure condition during the second speed time also occurs as explained above. The applied pressure output by the B1 solenoid valve 74 is cut off by the B1 release valve 58, and the B1 brake hydraulic servo 84 assumes the drain communication state, leaving the supply of applied pressure for the C1 clutch hydraulic servo 81 and the C3 clutch hydraulic servo 83 enabled. Hence, the third speed is achieved through simultaneous engagement of the C1 clutch C-1 and the C3 clutch C-3, enabling re-start and driving with the forward speed.

Figure 5:
FIG. 5 is a comparative chart describing the operation of each valve in the hydraulic control apparatus, forward speeds and hydraulic supply/removal of hydraulic pressure of the hydraulic servo in the first exemplary embodiment.

The relationship between the operation of each valve in the hydraulic control apparatus, forward speed and supply/removal of the hydraulic pressure by the hydraulic servos is shown in FIG. 5 as a comparative chart. As shown in FIG. 5, the drain element which prevents the engagement of the C2 clutch C-2 during the first through third speed and re-starting time, is the C2/B2 supply relay valve. The drain element which prevents engagement of the B2 brake B-2 during the second through sixth speed and re-starting time, is the B2 control valve. The drain element which prevents engagement of the B1 brake B-1 during the third speed, fifth speed and re-starting time, is the B1 release valve. The drain element which prevents engagement of the C3 clutch C-3 and the B1 brake B-1 during the fourth speed, is the B1/C3 release valve. The drain element which prevents engagement of the C1 clutch C-1 during the fifth and the sixth speeds, is the C1 release valve. The drain element which prevents engagement of the C3 clutch C-3 during the sixth speed is C3 release valve.

Figure 6:
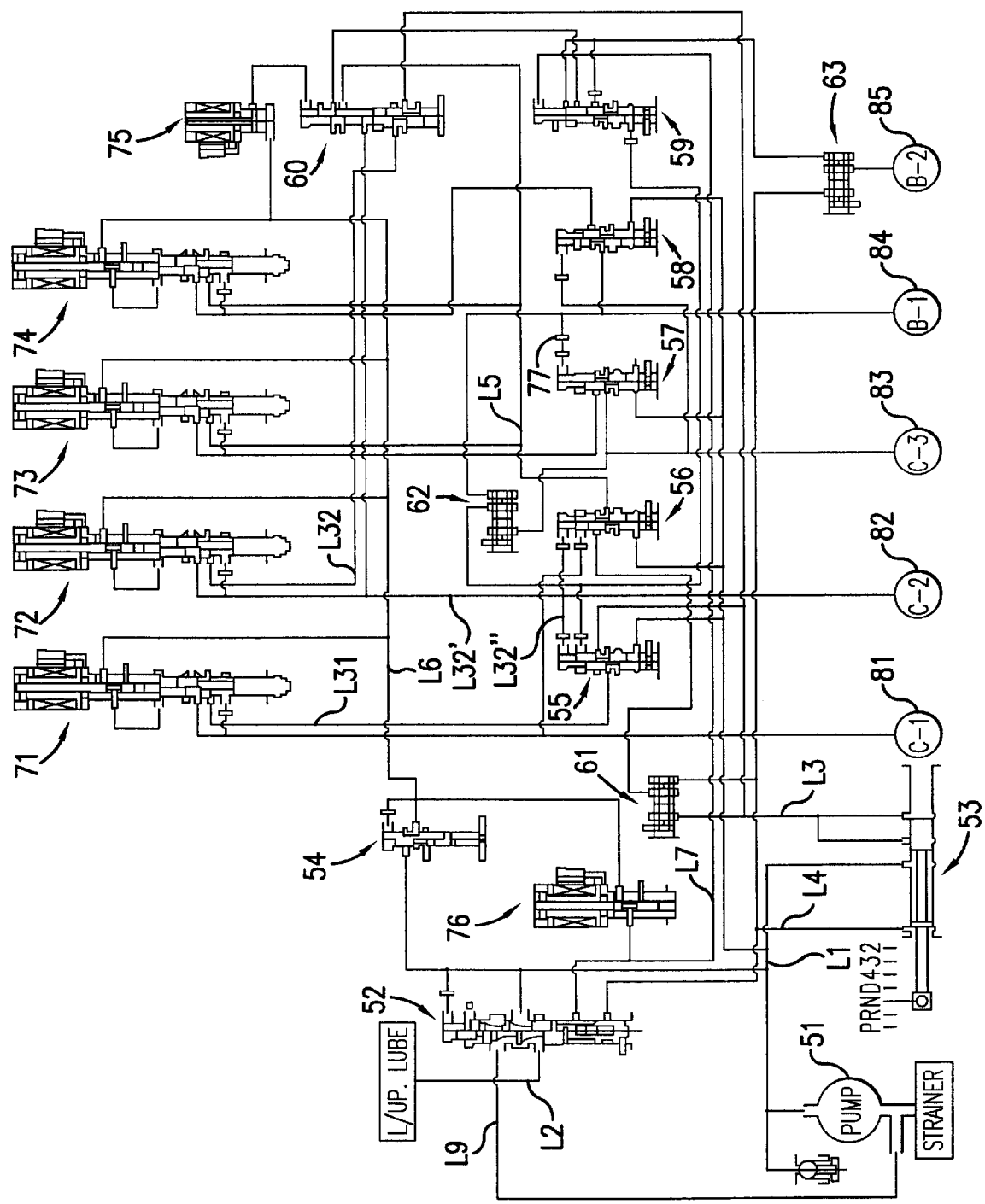
FIG. 6 is a circuit diagram of the hydraulic control apparatus of the second exemplary embodiment.
Figure 7:
FIG. 7 is comparative chart describing the operation of each valve in the hydraulic control apparatus, forward speeds and hydraulic supply/removal of hydraulic pressure of the hydraulic servo in the second exemplary embodiment.

FIGS. 6 and 7 describe the second exemplary embodiment. As the circuit structure of FIG. 6 illustrates, a structure is adopted in which the C3 release valve 57 executes a switching operation only by the applied pressure for the B1 brake hydraulic servo 84. With this change, the hydraulic path for applying the applied pressure of the C2 clutch hydraulic servo is eliminated, and moreover, an orifice provided for delaying the application of the signal pressure in the signal pressure hydraulic path which applies the apply pressure for the B1 brake hydraulic servo 84 to the spring load side receptor of the C3 release valve 57. The rest of the circuit structure is same as that in the first exemplary embodiment, hence, explanation is omitted.

With a structure in which switching operation of the C3 release valve is executed by the application of the single signal pressure as described above, a condition occurs for simultaneously supplying applied pressure to the C3 clutch hydraulic servo 83 and to the B1 brake hydraulic servo 84 during a failure, causing an unexpected supply to the B1 brake hydraulic servo 84 preceding before supply to the C3 clutch hydraulic servo 83, hence, the C3 release valve 57 (spool moves to right side position of FIG. 6) is switched, and supply of hydraulic pressure to the C3 clutch hydraulic servo 83 is blocked. Thus, the initially expected third speed state is not achieved. However, blockage is prevented by delaying the supply of the signal pressure to the C3 release valve 57 through the orifice 77, thus making sure that the supply of hydraulic pressure to the C3 clutch hydraulic servo 83 takes place before the switching operation of the C3 release valve 57. Hence, the supply of hydraulic pressure to the C3 clutch hydraulic servo 83 causes the application of the hydraulic pressure to B1 release valve first, which causes the B1 brake hydraulic servo 84 to be in the drain communication state through the switching of the B1 release valve 58. Thus, resulting in the circuit switching operation similar to that of the first exemplary embodiment.

The relationship between the operation of each valve in the hydraulic control apparatus, forward speeds, and supply and removal of hydraulic pressure of hydraulic servo is shown in the comparative chart in FIG. 7. Comparison with the chart in FIG. 5 of the first exemplary embodiment model shows that the C3 release valve 57 of FIG. 6 naturally operates as the second speed drain element during failure and that the signal pressure is different during the drain operation time.

Figure 8:
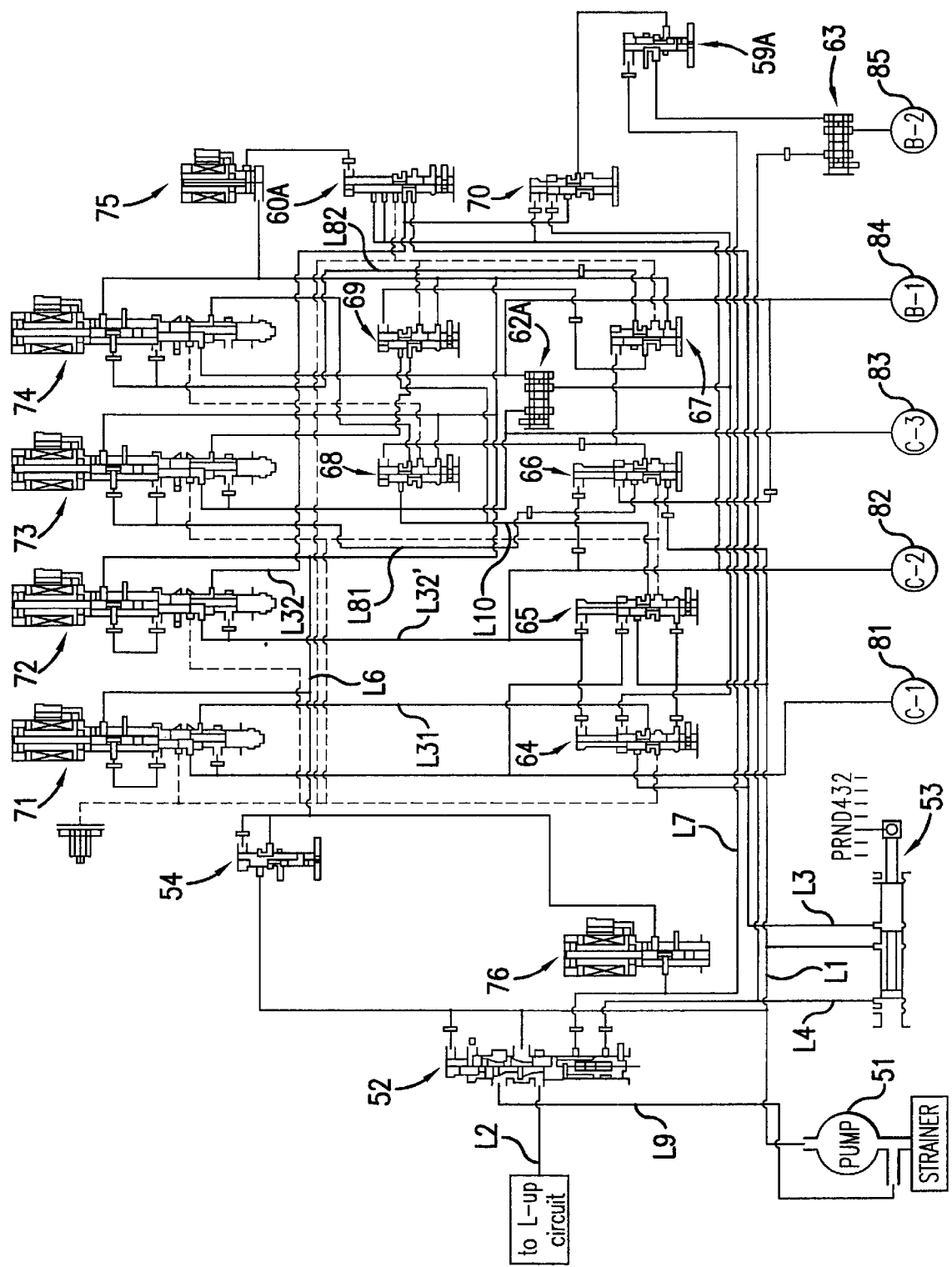
FIG. 8 is a circuit diagram of the hydraulic control apparatus of the third exemplary embodiment.

The third exemplary embodiment is described in FIG. 8. As shown in the circuit structure of FIG. 8, each of the valves 55 through 59, which is related to the fail safe function in the previous exemplary embodiments, are replaced with each of the valves 64 through 70 having generally the same function, further, the hydraulic path connection of these valves are changed slightly. Of these valves, the C1 cut-off valve 64, the B1/C3 cut-off valve 65 and the SLC3 release valve 66 are made to be spring loaded 3-port switching valves with differential diameter receptors in the spools, which are substantially similar to each of the valves 55 through 57 in the previous exemplary embodiment models, while the SLB1 release valve 67, the C3 apply relay valve 68 and the B1 apply relay valve 69 are made to be spring loaded 3-port switching valves without differential diameter receptor in the spools. Hereafter, the hydraulic connection relationship of each valve composing the circuit, mainly the changes, will be described. Here, the valves and the hydraulic path which are the same as in the previous exemplary embodiment models will be identified by the same symbols and the explanation will be omitted.

First, one side of the line pressure hydraulic path L1 is connected to the modulator valve 54. The other side of the line pressure hydraulic path L1 is connected through the input/output ports of the B1/C3 cut-off valve 65 to the common supply path L10 of the C3 clutch hydraulic servo 83 and the B1 brake hydraulic servo 84, and to each of the spool edge side receptor of the C1 cut-off valve 64, the B1/C3 cut-off valve 65 and the SLC3 release valve 66.

Next, the D-range hydraulic path L3 from the D-range output port of the manual valve 53 is respectively connected to the supply path L31 of the C1 clutch hydraulic servo 81 and to the supply path L32 of the C2 clutch hydraulic servo 82 through each input port of the C1 cut-off valve 64 and the C2 supply relay valve 60A. Moreover, the R-range hydraulic path L4 from the R-range output port is connected, in addition to the plunger edge side receptor of the primary regulator valve 52, to one of input ports of the shuttle valve 63 in the supply path of the B2 brake hydraulic servo 85.

The hydraulic path L32' of the supply path L31 for the C1 clutch hydraulic servo 81 downstream from the C2 solenoid valve (SLC2) 72 is connected to the signal pressure port of each of spring load side spool edges of the C2 supply relay valve 60A, the SLC3 release valve 66, the C1 cut-off valve 64 and the B1/C3 cut-off valve 65.

The hydraulic path L32' which is downstream from the C2 solenoid valve (SLC2) of the supply path L32 for the C2 clutch hydraulic servo 82 is connected to the C2 supply relay valve 60A, the SLC3 release valve 66, the C1 cut-off valve 64 and to the signal pressure port of each spring load side spool edge of the B1/C3 cutoff valve 65.

The supply path for the C3 clutch hydraulic servo 83 is made to be a supply path L10 which is connected, through the B1/C3 cut-off valve 65, to the line pressure hydraulic path L1 as described before, and the B1 apply relay valve 69 is arranged in the middle of the hydraulic path leading to the C3 solenoid valve (SLC3). The C3 solenoid valve 73, unlike the previous exemplary embodiment, has the output port of the linear solenoid valve part connected, by the signal path L81 through the input/output port of the SLC3 release valve 66, to the signal pressure port of each of the spring load side spool edge of the SLB1 release valve 67 and the C3 apply relay valve 68, to make the solenoid pressure output from the linear solenoid valve part of the hydraulic pressure to the hydraulic servo operating the friction element. In this supply path, the C3 clutch hydraulic servo 83 is also connected to one input port of the shuttle valve 62A.

The supply path for the B1 brake hydraulic servo 84 is made to be a supply path L10 which is connected, through the B1/C3 cut-off valve 65, to the line pressure hydraulic path L1 as described before, and the C3 apply relay valve 68 is arranged in the middle of the hydraulic path leading to the B1 solenoid valve SLB1. The B1 solenoid valve 74, similar to the C1 solenoid valve, has the output port of the linear solenoid valve part connected, by the signal path L82 through the input/output port of the SLB1 release valve 67, to the signal pressure port of the spring loaded side spool edge of the B1 apply relay valve 69, to output solenoid pressure from the linear solenoid valve part directly to the circuit. In the supply path, the B1 brake hydraulic servo 84 is also connected to the other input port of the shuttle valve 62A.

The supply path for the B2 brake hydraulic servo 85 is structured in such a manner that one supply path is connected, through the shuttle valve 63, to the R-range hydraulic path L4, and the other supply path is made to be a supply path from the D-range hydraulic path L3 with the C2 supply relay valve 60A, the B2 cut-off valve 70 and the B2 control valve 59A arranged on the hydraulic path in series. Further, the shuttle valve 63 is placed in the downstream. The C2 supply relay valve 60A in the exemplary embodiment, unlike the C2 supply relay valve 60 of the previous exemplary embodiments, is made to be a spring loaded 3-port switching valve which switches, with one spool operated by the plunger, output port connecting to the input port of B2 cut-off valve 70 with the input port and the drain port connecting to the D-range hydraulic path L3. Moreover, modulator pressure from the solenoid valve 75 is applied to one edge of the plunger, while the applied pressure for the C2 clutch hydraulic servo 82 applied to the other edge, which abuts the spool.

In the hydraulic circuit with above structure, during the "N" position of the manual valve 53, the input port connecting to the line pressure hydraulic path L1 is shut by the land and all the output ports are drained. Hence, a module pressure which is adjusted by the solenoid modulator valve 54 leading to the direct line pressure hydraulic path L1 is output to the modulator hydraulic path L6. However, signals of each of solenoid valves 71–74 are turned on, while signals of solenoid valve 75 turned off. Moreover, the input port of each of the solenoid valves 71, 72 is in the drain state and the hydraulic pressure is not supplied, and the solenoid valve 75 is in the state where the input port and the output valve are cut off. Hence applied pressure output from these solenoid valves 71–74 and the application of solenoid pressure from the solenoid valve 75 does not occur.

Moreover, a line pressure is applied to the spool edge side signal pressure port of each of the valves 64–66 which are connected to the line pressure hydraulic path L1. Hence, each of these valves are switched, against the spring force, to upper positions of FIG. 8. Hence, the hydraulic pressure is supplied from the B1/C3 cut-off valve 65 to the supply path L10, and the hydraulic pressure is led as far as the input port of the solenoid valve 73, 74, respectively, through the C3 apply relay valve 68 and the B1 apply relay valve 69, but because the solenoid pressure is not applied to the solenoid valves 73, 74, both output of applied pressure for hydraulic servos 83, 84 and output of solenoid pressure for the signal paths L81, L82 corresponding to these solenoid valves 73, 74 does not occur. This communication relationship is the same as the case of the "P" position of the manual valve 53, except for the spool position.

When the manual valve 53 is changed to the "D" position, the line pressure is output also to the D-range hydraulic path L3, causing the hydraulic pressure of D-range hydraulic path L3 to be supplied to each input port of each solenoid valve 71, 73, 74, except for the C2 solenoid valve 72, and the C2 supply relay valve 60A. Hydraulic pressure of the D-range hydraulic path L3 through C1 cut-off valve 64, which is in the communication state at the right side of FIG. 8 is supplied to the input port of the C 1 solenoid valve 71 on the hydraulic path L31. Hydraulic pressure of the line pressure path L1 through the "N" position path is also supplied to the input port of the C3 solenoid valve 73 and the B1 solenoid valve 74 on the supply path L10, and hydraulic pressure of the D-range hydraulic path L3 is supplied to the input port of the C2 supply relay valve 60A. Here, for the hydraulic path L32 to the input port of the C2 solenoid valve 72, the solenoid pressure to the receptor at the plunger edge side of C2 supply relay valve 60A is not applied due to the off-signal from the solenoid valve 75. Moreover, hydraulic pressure from the hydraulic path L32' to the abutting section of both spools is also not applied, hence, hydraulic pressure supply condition is not enabled with drain being at the right side of FIG. 8 by the energized force of the spring.

Next, the valve operation during normal time will be described. Upon turning off the signal to the C1 solenoid valve 71 to achieve the first speed, the line pressure of the D-range hydraulic path L3, which is supplied as far as the C1 solenoid valve 71, is adjusted by the valve 71 to become applied pressure and is supplied to the C1 clutch hydraulic servo 81. As a result, the C1 clutch C-1 is engaged and the first speed is achieved through the cooperation of the one-way clutch F-1. At this time, the applied pressure to the C1 clutch C-1 is applied, through the orifice, to the differential diameter receptor part of the B1/C3 cut-off valve 65. However, due to the valve receptor relationship, switching of the B1/C3 cut-off valve 65 does not occur, and the above hydraulic pressure supply relationship is maintained. Moreover, because the C2 supply relay valve 60A is located at the right side of FIG. 8, the connection between the C2 solenoid valve 72 and the D-range hydraulic path L3 is mechanically cut off.

The second speed is achieved by turning off the signal to the C1 solenoid valve 71 and the B1 solenoid valve 74. In addition to the applied pressure supply state to the C1 clutch hydraulic servo 81, the B1 solenoid valve 74 enters the pressure adjustment state, and the adjusted applied pressure is supplied to the B1 brake hydraulic servo 84. As a result, the second speed is achieved through the engagement of the C1 clutch C-1 and reaction force support of the B1 brake B-1. Here in this state, the applied pressure for the B1 brake B-1 is applied, through the orifice, to the differential diameter pressure receptor of the SLC3 release valve 66, and the applied pressure through the shuttle valve 62 is also applied to the differential diameter pressure receptor of the C1 cut-off valve 64. However, due to receiving pressure balance, the C1 cut-off valve switch does not occur. At the same time, the applied pressure of the B1 brake B-1 is applied to the differential diameter receptor of the B2 cut-off valve 70, causing the B2 cut-off valve 70 to switch to the left hand position of FIG. 8, which mechanically cuts off the hydraulic pressure supply to the B2 brake hydraulic servo 85. Moreover, the solenoid pressure is output from the B1 solenoid valve 74 to the signal path L82, which is applied to the spring load side receptor of the B1 apply relay valve 69 through the SLB1 release valve 67 in the conductive state, and due to the relationship of the receiving pressure balance with the modulator pressure applied to the spool edge side, the B1 apply relay valve 69 switches position to the left side of FIG. 8, thus mechanically cutting-off the hydraulic pressure supply from the supply hydraulic path L10 to the C3 solenoid valve 73.

The third speed is achieved by turning off the signal to the C1 solenoid valve 71 and to the C3 solenoid valve 73. While applied pressure supply state to the C1 clutch hydraulic servo 81 remains unchanged, the C3 solenoid valve 73 enters the pressure adjustment state, and the applied pressure is supplied to the C3 clutch hydraulic servo 83. As a result, the third speed is achieved through the simultaneous engagement of the C1 clutch C-1 and the C3 clutch C-3. Moreover, the applied pressure for the C3 clutch hydraulic servo 83 is applied to the differential diameter receptor of the C1 cut-off valve 64 and the differential diameter receptor of the B2 cut-off valve 70 through the shuttle valve 62A, as in the case of above second speed, resulting in the same condition as the second speed. Moreover, at the same time, the solenoid pressure is output from the C3 solenoid valve 73 to the signal path L81, which is applied to the spring load side receptor of the C3 apply relay valve 68 through the SLC3 release valve 66 in the conductive state, and due to the relationship of the receiving pressure balance with the modulator pressure applied to the spool edge side, the C3 apply relay valve 68 switches position to the left side of FIG. 8. Thus, mechanically cutting-off the hydraulic pressure supply from the supply hydraulic path L10 to the B1 solenoid valve 74.

The fourth speed is achieved by turning off the signal to the C1 solenoid valve 71 and the C2 solenoid valve 72, and turning on the signal to the solenoid valve (SL1) 75. While the applied pressure supply state to the C1 clutch hydraulic servo 81 remains unchanged, modulator pressure output by the solenoid valve 75 is applied to the plunger edge receptor of the C2 supply relay valve 60A, causing the valve 60A to be pushed by the plunger, and to switch to the left side location of FIG. 8. Hence, hydraulic pressure of the D-range hydraulic path L3 is supplied to the C2 solenoid valve 72 through the hydraulic path L32. As a result, the C2 solenoid valve 72 becomes the applied pressure adjustment state, and the applied pressure is supplied to the C2 clutch hydraulic servo 82. The applied pressure, on one hand, is applied to the spring load edge side receptor of the C1 cut-off valve 55, and on the other hand, applied to the spring load edge side receptor of the B1/C3 cut-off valve 65 and to the spring load side receptor of the SLC3 release valve 66, and further to the in-between spool receptor of the C2 supply relay valve 60A. As a result, when applied pressure rises to the line pressure, the B1/C3 cut-off valve 65 switches to the left side location of FIG. 8, mechanically cutting off the connection between the D-range hydraulic path L3, the B 1 solenoid valve 74 and the C3 solenoid valve 73. Moreover, the spool of the C2 supply relay valve 60A changes to the left side position of FIG. 8 when the applied pressure for the C2 clutch hydraulic servo 84 assumes the designated pressure, which is lower than the line pressure, and is maintained, without fail, at the left side position of FIG. 8 when the applied pressure rises to the line pressure. Once the maintenance state is established, the on signal to the solenoid valve 75, while no longer necessary, is turned off at the appropriate time. In fact, signals to the solenoid valve 75 is made only during speed change, and is off during the normal state after completion of the speed change. In this manner, the fourth speed is achieved through the simultaneous engagement of the C1 clutch and the C2 clutch.

The fifth speed is achieved by turning off the signal to the C2 solenoid valve 72, and to the C3 solenoid valve 73 and turning on the signal to the solenoid valve 75. In this state, the applied pressure for the C2 clutch hydraulic servo 82 is applied similarly to the similar valve as in the case of the fourth speed, and the applied pressure for the C3 hydraulic servo 83 is applied similarly to the similar valve as in the case of the third speed. Due to the combination of these hydraulic pressure applications, both applied pressures are applied to the differential diameter receptor part and to the spring load side receptor of the C1 cut-off valve 64. When these hydraulic pressures rise to the line pressure, the C1 cut-off valve 64 switches to the left side position of FIG. 8, thus mechanically cutting off the connection between the C1 solenoid valve 71 and the D-range, hydraulic path L3. However, this operation does not relate to the operations of the other valves. Moreover, at the same time, the solenoid pressure is output from the C3 solenoid valve 73 to the signal path L81, which is applied to the spring load side receptor of the C3 apply relay valve 68 through the SLC3 release valve 66 in the conductive state, and due to relationship of the receiving pressure balance with the modulator pressure applied to the spool edge side, the C3 apply relay valve 68 switches position to the left side of FIG. 8, thus mechanically cutting-off the hydraulic pressure supply from the supply hydraulic path L10 to the B1 solenoid valve 74. As a result, the fifth speed is achieved through simultaneous engagement of the C2 clutch C-2 and the C3 clutch C-3.

The sixth speed is achieved by turning off the signal to the C2 solenoid valve 72 and the B1 solenoid valve 74 and turning on the signal to the solenoid valve 75. Operation by the hydraulic pressure output by the solenoid valve 75 is similar to the operations of the fourth and fifth speeds. Moreover, the applied pressure for the B1 brake hydraulic servo 84 is applied similarly to the similar valve as in the second speed. Both applied pressures are applied to the differential diameter receptor part and to the spring load side receptor of the SLC3 release valve 66, and when these hydraulic pressures rise to the line pressure, the SLC3 release valve 66 switches to the left side position of FIG. 8, thus mechanically cutting off the connection between the line pressure hydraulic path L1 and the C3 clutch hydraulic servo. Moreover, both applied pressures are also applied to the differential diameter receptor part and to the spring load side receptor of the C1 cut-off valve 64, and when these hydraulic pressures rise to the line pressure, the C1 cut-off valve 64 switches to the left side position of FIG. 8, thus mechanically cutting off the connection between the C1 solenoid valve 71 and the D-range hydraulic path L3. However, the operation does not relate to the operations of other valves. As a result, the sixth speed is achieved through the engagement of the C2 clutch C-2 and the B1 brake B-1 reaction force support.

Reverse speed is achieved by switching the position of the manual valve 53 to the "R" position and by turning off the signals to the C3 solenoid valve 73. In this case, the D-range hydraulic path L3 is cut off, but the line pressure is output to the R-range hydraulic path L4, with hydraulic pressure directly supplied to the B2 brake hydraulic servo 85 through the shuttle valve 63. Meanwhile, the line pressure of the line pressure hydraulic path L1 is supplied also to the input port of the B1/C3 cut-off valve 65, with hydraulic pressure supplied to the B1 apply relay valve 69 through the B1/C3 cut-off valve 65 located at the right side position of FIG. 8 by permanently applied line pressure and to the C3 solenoid valve 73 through the valve in the conductive state, and to the C3 clutch hydraulic servo 83 from the C3 solenoid valve 73 which is in the applied pressure output state due to the off signal by permanently applied line pressure. As a result, the reverse speed is achieved through the engagement of the C3 clutch C-3 and the B2 brake B-2 reaction force support.

Next, a description will be given concerning the operation, during failure time, of the hydraulic control apparatus which, under normal condition, assumes the above hydraulic pressure supply state. In this case, regardless of the achieved forward speed, each permanently open solenoid valves 71–74 assumes the applied pressure supply state, while the permanently closed solenoid valve 75 assumes the solenoid pressure cut-off state. Examining this state during achievement of the first speed, the C2 solenoid valve 72 does not assume applied pressure output state due to its input port being in the drain state through the C2 supply relay valve 60A (drain path is shown with broken line in the figure), but the other two valves, the C3 solenoid valve 73 and the B1 solenoid valve 74, assume applied pressure output state. As a result, the applied pressure of the C3 solenoid valve 73 is about to be supplied to the B1 brake hydraulic servo 83, but the C3 apply relay valve 68, due to application of the solenoid pressure output by the C3 solenoid valve 74 to its spring load side through the SLC3 release valve 66, changes to the left hand side position of FIG. 8 against the application of the modulator pressure, cutting off the line pressure and switching the B1 brake hydraulic servo 84 to drain through the C3 apply relay valve 68. Similarly, the solenoid pressure is output from the B1 solenoid valve 74, the solenoid pressure is cut off by the SLB1 release valve 67, which is switched to the shut position by applying the solenoid pressure of the C3 solenoid valve 73 applied through the SLC3 release valve 66 to the spring load side receptor, but does not reach the spring load side receptor of the B1 apply relay valve 69. Hence, switching of the valve does not occur. Here, the supply path to the B2 hydraulic servo 85, due to the permanently closed solenoid valve 75, remaining in the cut-off state and does not assume the applied pressure supply state because the path is drained by the C2 supply relay valve 60A. Hence, during the first speed failure, the apparatus is shifted upwards to the third speed achievement state in which the C1 clutch C-1 and the C3 clutch C-3 sengage simultaneously.

During the second speed achievement time, the C1 clutch hydraulic servo 81 and the B1 brake hydraulic servo 84 initially assume the apply pressure supply state under the operation of the C1 solenoid valve 71 and the B1 solenoid valve 74. However, when the failure state occurs, the C3 solenoid valve 73, except for the C2 solenoid valve 72, which is mechanically cut-off hydraulic pressure supply, assumes the apply pressure supply state. Hence, the C1 clutch servo 81 and the B1 brake hydraulic servo 84 ultimately assume the similar hydraulic pressure supply state to the time of the first speed failure. Hence, in this case, the solenoid pressure output from the C3 solenoid valve 73 is applied to the C3 apply relay valve 68 through the SLC3 release valve 66. Meanwhile, due to the application of the solenoid pressure, the SLB1 release valve 67 is drained, thus cutting off the B1 apply relay valve 69 and the B1 solenoid valve 74. Hence, during second speed failure also, the apparatus is shifted upwards to the third speed achievement state in which the C1 clutch C-1 and the C3 clutch C-3 engage simultaneously.

During the third speed achievement time, applied pressure for the C3 clutch hydraulic servo 83 exists from the beginning. Hence, change does not occur against the normal time hydraulic pressure supply even during the failure time due to the C3 apply relay valve 68 in the drain communication state in which applied pressure for the B1 brake hydraulic servo 84 on the left hand side of FIG. 8 is cut off. Hence, during the third speed failure time, simultaneous engagement of the C1 clutch and the C3 clutch is kept unchanged and the third speed achievement state is maintained.

During the fourth speed achievement time, applied pressure supply state for the C1 clutch hydraulic servo 81 and the C2 clutch hydraulic servo 82 exists at the beginning, and input ports of the other two solenoid valves, the C3 solenoid valve 73 and the B1 solenoid valve 74 are in the drain communication state due to the hydraulic path L10 cut off by the B1/C3 cut off valve 65, and applied pressure is not output even when these two valves assume the off signal state during failure. Moreover, signals to the solenoid valve 75 are off due to failure, but it does not affect the operation of the C2 supply relay valve 60A because the signal to the valve 75 is off during the normal state, as described above. In this circuit, the spool of the C2 supply relay valve 60A is self-maintained at the left side of FIG. 8 due to the applied pressure for the C2 clutch hydraulic servo 82. Hence, the supply of the applied pressure to the C2 clutch hydraulic servo 82 from the C2 solenoid valve 72 is maintained. Hence, during the fourth speed failure time, the supply state of the apply pressure for the C1 clutch hydraulic servo 81 and the C2 clutch hydraulic servo 82 from the beginning is kept unchanged and the fourth speed achievement state is maintained.

Next, during the fifth speed achievement time, the C2 clutch hydraulic servo 82 and the C3 clutch hydraulic servo 83 are in the applied pressure supply state to begin with, and because the hydraulic pressure supply to the C1 solenoid valve 71 is cut off due to the superimposed application of the C2 clutch applied pressure and the C3 clutch applied pressure for the C1 cut off valve 64, supply of the applied pressure to C1 clutch servo 81 is not achieved even if the C1 solenoid valve 71 assumes the control state due to the off signal caused by the failure. Similarly, the supply path for the B 1 brake hydraulic servo 84 is cut off by the C3 apply relay valve 68 to which the solenoid pressure of the C3 solenoid valve 73 is applied. Hence, the applied pressure to the B1 brake hydraulic servo 84 is not achieved even if the B1 solenoid valve 74 assumes the control state due to the off signal caused by the failure. Moreover, the solenoid pressure, cut off by the SLB1 release valve 67, does not reach the B1 apply relay valve 69. In this case, the state of the C2 supply relay valve 60A, caused by the off signal for the solenoid valve 75 is same as the case of the fourth speed failure time. Hence, the engagement state of the C2 clutch C-2 and the C3 clutch C-3 does not change in the fifth speed failure time as well and the fifth speed achievement state is maintained.

During the sixth speed achievement time, the C2 clutch hydraulic servo 82 and the B1 brake hydraulic servo 84 are in the applied pressure supply state to begin with, and in the case of the fifth speed time, the supply path L31 to the C1 solenoid valve 71 is cut off by the C1 cut off valve 65. Hence, supply of the applied pressure to the C1 clutch hydraulic servo 81 is not achieved even if the C1 solenoid valve 71 assumes the control state due to the off signal caused by the failure. Moreover, the supply path to the C3 clutch hydraulic servo 83 from the C3 solenoid valve 73 is cut off by the B1 applied relay valve 69 at the left side position of FIG. 8 to which the solenoid pressure output by the B1 solenoid valve 74 applied through the SLB1 release valve 67. Hence, the supply of applied pressure to the C3 clutch hydraulic servo 83 is not achieved even if the C3 solenoid valve 73 assumes the control state with the off signal caused by the failure. Moreover, the supply of hydraulic pressure to the B1 brake hydraulic servo 84 is cut off by the SLC3 release valve 66 at the left side position of FIG. 8 due to the superimposed application of the C2 clutch applied pressure and the B1 brake applied pressure to the solenoid pressure output by the C3 solenoid valve 73. Hence it does not reach the C3 apply relay valve 68 and is continued by the valve maintaining release condition. In this case, the state of the C2 supply relay valve 60A caused by the off signal to the solenoid valve 75 is the same as in the case of fourth speed failure. As a result, the engagement of the C2 clutch C-1 and the B1 brake B-1 is maintained and the sixth speed achievement state is kept unchanged.

Here, during the reverse speed achievement time, because the supply of line pressure itself to the D-range hydraulic path L3 from the manual valve 53 cease to exist, only the supply of the hydraulic pressure of the B1 brake hydraulic servo 84, which is supplied from the line pressure hydraulic path L1, becomes a problem. However, because the supply path to the C3 apply relay valve 68 is cut off by the application of the solenoid pressure output by the C3 solenoid valve 73, the applied pressure is not supplied even if the B1 solenoid valve 74 assumes the control state. Moreover, the solenoid pressure output by the B1 solenoid valve 73, through the modulator pressure, does not affect the operation of the B1 apply relay valve 69 because it is cut off by the SLB1 release valve 67 to which the solenoid pressure output by the C3 solenoid valve 73 is applied. Hence the reverse speed is achieved regardless of the failure of each solenoid valve.

Furthermore, in the circuit structure, switching to the "D" position is executed after re-starting all three solenoid valves 71, 73 and 74, except for the C2 solenoid valve 72 whose communication to the D-range hydraulic path L3 is cut off by the C2 supply relay valve 60A due to the off signal state of the solenoid valve 75, becomes ready to output the applied pressure, but the hydraulic path communication similar to a failure condition during the second speed time occurs also in this case. The applied pressure for the B1 solenoid valve 74 is cut off by the C3 apply relay valve 68, which switches with the solenoid pressure from the C3 solenoid valve, and the B1 brake hydraulic servo 84 assumes the drain communication state, leaving the supply of applied pressure for only the C1 clutch hydraulic servo 81 and the C3 clutch hydraulic servo 83 enabled. Hence, in this case also, the third speed is achieved through simultaneous engagement of the C1 clutch C-1 and the C3 clutch C-3, enabling re-start and driving with the forward speed.

The relationship between the operation of each valve in the hydraulic control apparatus, forward speed and supply/removal of the hydraulic pressure by the hydraulic servos in the exemplary embodiment model is shown in FIG. 9 as comparative chart. As described in FIG. 9, the drain element which prevents engagement of the C2 clutch C-2 during the first through third speed and re-starting time, is the C2 supply relay valve. The drain element which prevents engagement of the B2 brake B-2 during the second through sixth speed and re-starting time is the B2 cut off valve. The drain element which prevents engagement of the B1 brake B-1 during the third speed, fifth speed and re-starting time, is the C3 apply relay valve and the SLB1 release valve. The drain element which prevents engagement of the C3 clutch C-3 and the B1 brake B-1 during the fourth speed, is the B1/C3 cut-off valve. The drain element which prevents engagement of the C1 clutch C-1 during the fifth and the sixth speeds, is the C1 cut-off valve. The drain element which prevents engagement of the C3 clutch C-3 during the sixth speed is the B1 apply relay valve and the SLC3 release valve.

Figure 10:
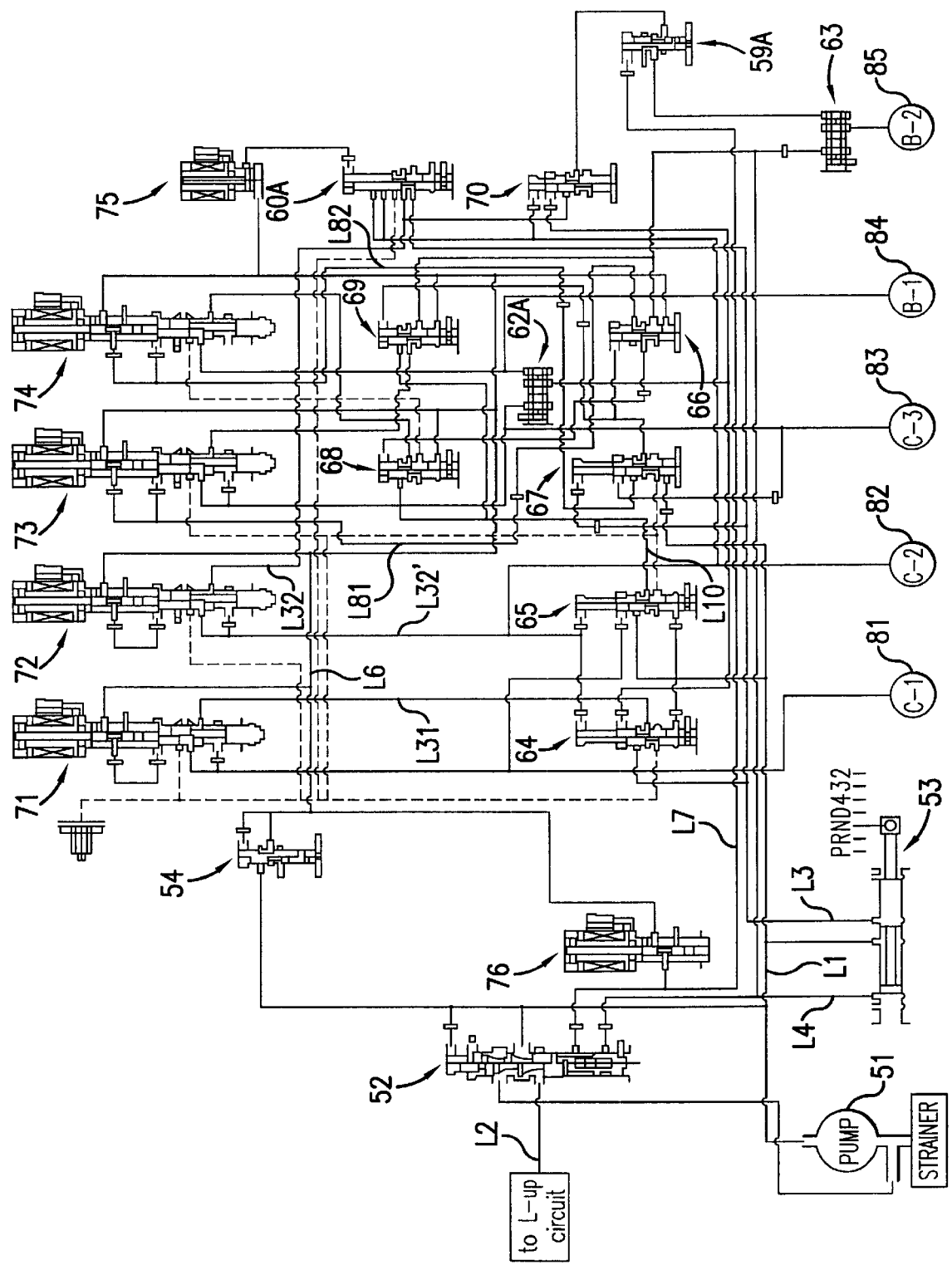
FIG. 10 is a circuit diagram of the hydraulic control apparatus of the fourth exemplary embodiment.

The fourth exemplary embodiment is shown in FIGS. 10 and 11. As the circuit structure of FIG. 10 illustrates, only a portion of the hydraulic pressure path is changed using each of the fail safe related valves 60–70 in the previous third exemplary embodiment, enabling the fixing of the low speed side through the second side. Hereafter, the relationship of the hydraulic connections in the circuit, mainly the changes, will be described. Moreover, valves and hydraulic paths, which are same as the ones in the previous exemplary embodiment will be denoted by the same symbols and the explanation will be omitted.

In this model, in the SLB1 release valve 67, the spring load side receptor is connected with the D-range hydraulic path L3, differential diameter receptor is connected with the C3 apply pressure supply hydraulic path, the input port is connected with the solenoid pressure signal path L82 of B1 solenoid valve 74, and the output port is connected with the spring load side receptor of the B1 apply relay valve 69. Moreover, in the SLC3 release valve 66, the input port is changed to connect with the solenoid pressure signal path L81 of the C3 solenoid valve 73. The output port is changed to connect with the spring load side receptor of the C3 applied relay valve 68. The port which, was made to be the drain port, is changed to connect with the R-range hydraulic path L4 and with the port which was made to be the drain port of the B1 apply relay valve 69.

Hydraulic path communication relation during each speed achievement time differs with the third exemplary embodiment during the second, third, fifth, sixth and reverse speed of D-range when the solenoid pressure is output from the C3 solenoid valve 73 and the B1 solenoid valve 74. In fact, during the second speed and the sixth speed, supply of the D-range pressure to the C3 solenoid valve 73 is cut off by application of the solenoid pressure output from the B1 solenoid valve 74 to the spring load side receptor of the B1 apply relay valve 69 through the SLB1 release valve 67. Moreover, during the third speed, fifth speed and reverse speed, supply of the D-range pressure to the B1 solenoid valve 74 is cut off by applying the solenoid pressure output from the C3 solenoid valve 73 to the spring load side receptor of the C3 apply relay valve 68 through the SLC3 release valve 66.

Moreover, from above cut-off relationship, during the failure state in the first speed, the solenoid pressure from the B1 solenoid valve 74 is applied to the B1 applied relay valve 69 before the applied pressure for the C3 clutch hydraulic servo 83 rises to the line pressure, resulting in cutting off the supply of the line pressure to the C3 solenoid valve 73. Hence, switching of the SLB1 release valve 67 does not occur, and the solenoid pressure output by the B1 solenoid valve 74 through the SLB1 release valve 74 continues to be applied to the B1 apply relay valve 69, leaving the supply of applied pressure only to the C1 clutch hydraulic servo 81 and the B1 brake hydraulic servo 84 enabled. Hence, the second speed is achieved through simultaneous engagement of the C1 clutch C-1 and the B1 brake B-1.

Moreover, for the second speed, even if the solenoid pressure is output from the C3 solenoid valve 73, the solenoid pressure is not applied to the C3 apply relay valve 68 due to the cut-off state of the SLC3 release valve 66. Hence the supply of hydraulic pressure to the C1 clutch hydraulic servo 81 and the B1 brake hydraulic servo kept unchanged and the second speed maintained.

The relationship between the initial speed and the speed after failure during achievement of other speeds is the same as the third exemplary embodiment, hence FIG. 11 is provided, showing a comparative illustration of the relationship between the operation of each valve, forward speed and supply/removal of hydraulic pressure of hydraulic servo in the hydraulic control apparatus.

Now, if switching to the "D" position is executed after re-stating in the circuit structure, all of the three solenoid valves 71, 73, 74, except for the C2 solenoid valve whose communication to the D-range hydraulic path L3 is cut off by the off signal of the solenoid valve 75, are ready to output applied pressure. However, if re-start is executed with the N and P ranges, the applied pressure is output from the solenoid valves 73, 74 which are connected to the line pressure hydraulic path L1 and, at the same time, the position of the SLB1 release valve 67 is switched to the right side of FIG. 10 against the spring load due to the line pressure from the line pressure hydraulic path L1, which is connected to SLB1 release valve 67. Hence, the solenoid pressure output from the B1 solenoid valve 74 is applied to the B1 apply relay valve 69 before the applied pressure for the C3 clutch hydraulic servo 83 rises to the line pressure, mechanically cutting off the communication between the C3 clutch hydraulic servo 83 and the solenoid valve 73. As a result, if a switch to the "D" position is performed, and D-range pressure is applied to the spring load side receptor of the SLB1 release valve 67, the position of the SLB1 release valve 67 remains at the right side of FIG. 10 because the applied pressure of the C3 clutch is not applied to the differential diameter receptor. As a result, only the supply of the applied pressure to the C1 clutch hydraulic servo 81 and the B1 brake hydraulic servo 84 becomes enabled. Hence, the second speed is achieved through simultaneous engagement of the C1 clutch C-1 and the B1 brake B-1, and driving starting and driving by this speed becomes enabled.

The relationship between the operation of each valve in the hydraulic control apparatus, forward speed and supply/removal of hydraulic pressure by hydraulic servos in the exemplary embodiment is shown in FIG. 11. As described in FIG. 11, the drain element which prevents the engagement of the C2 clutch during the first through third speed and re-starting time, is the C2 supply relay valve. The drain element which prevents the engagement of the B2 brake during the second through sixth speed and re-starting time, is the B2 cut off valve. The drain element which prevents the engagement of the B1 brake B-1 during the third speed and fifth speed, is the C3 apply relay valve and the SLB1 release valve. The drain element which prevents the engagement of the C3 clutch and the B1 brake B-1 during the fourth speed, is the B1/C3 cut-off valve. The drain element which prevents the engagement of the C1 clutch C-1 during the fifth and the sixth speeds, is the C1 cut-off valve. The drain element which prevents the engagement of the C3 clutch C-3 during the second and the sixth speeds, is the B1 apply relay valve and the SLC3 release valve.

As described above, the invention is illustrated with four exemplary embodiments, but ideas of the invention are not limited to the hydraulic circuits referred to as examples, but are applicable to wide range of general hydraulic control circuit.

What is claimed is:

1. A hydraulic control apparatus of an automatic transmission, comprising:

a hydraulic source;

a first, a second and a third hydraulic path which are connected to the hydraulic source;

a first, a second and a third hydraulic servo which are connected with the first, second and third hydraulic paths and which operate a first, a second and a third friction element, wherein predetermined forward speeds out of a plurality of speeds are achieved by engagement of at least two friction elements;

a first, a second and a third control means which are arranged in the first, second and third hydraulic paths and operate an engagement and a release through a supply and removal of hydraulic pressure to the first, the second and the third servos, wherein, in the predetermined forward speeds, the first friction element and the third friction element are engaged by the first and third control means;

a first valve which is arranged on the second hydraulic path and which cuts off hydraulic pressure from the hydraulic source to the second hydraulic servo with downstream side hydraulic pressure of the first control means as a first signal pressure and with downstream side hydraulic pressure of the third control means as a second signal pressure; and a second valve which is arranged on the first hydraulic path and which cuts off hydraulic pressure to the first hydraulic servo and the first signal pressure, wherein the first valve cuts off the hydraulic pressure from the hydraulic source to the second hydraulic servo when both of the first signal pressure and the second signal pressure are impressed.

2. The hydraulic control apparatus of an automatic transmission of claim 1, further comprising:

a third valve which is arranged in between the hydraulic source and the first and second control means and which is capable of selectively switching a supply and cutting off of hydraulic pressure to the first and second control means, wherein, the second valve assumes a position to cut off hydraulic pressure to the first hydraulic servo and the first signal pressure to the first valve when the third valve assumes a position to cut off hydraulic pressure to the first and second control means.

3. The hydraulic control apparatus of an automatic transmission of claim 1, wherein the second valve is arranged in an upstream side of a signal pressure supply hydraulic path, a branch of the first hydraulic path, to the first valve.

4. The hydraulic control apparatus of an automatic transmission of claim 1, wherein when the first control means outputs hydraulic pressure and condition changes from an engagement of the first friction element to the second control means ready to output hydraulic pressure enabling supply of hydraulic pressure to the second hydraulic servo, at least predetermined forward speeds are achieved by releasing the second friction element using at least the first valve, and wherein when the predetermined forward speed is a high speed, the first friction element is released at a low speed and is engaged at a high speed, and the second friction element, which is released by hydraulic pressure to the first friction element, is engaged at the low speeds and is released at high speeds.

5. The hydraulic control apparatus of an automatic transmission of claim 4, wherein the second valve is structured in such a manner that hydraulic pressure to the first hydraulic servo which operates the friction element to be released during the low speed time is applied to the second valve, and wherein hydraulic pressure supply state is enabled by running current to the signal pressure generation means when the friction element is engaged, after which the hydraulic pressure supply enable state is maintained even if the current is stopped.

6. The hydraulic control apparatus of an automatic transmission of claim 4, further comprising the third friction element and the third control means for controlling engagement and release by supplying and removing hydraulic pressure to the hydraulic servo which operates the third friction element, wherein when the first control means and the second control means output hydraulic pressure, condition changes from engagement of the first friction element and the second friction element to the third control means ready to output hydraulic pressure, enabling supply of hydraulic pressure to the hydraulic servo, forward speed differing from the predetermined forward speed is further achieved, and wherein the second friction element to be released with hydraulic pressure, as signal pressure, to the hydraulic servo which operates the first friction element achieves forward speed differing from the predetermined forward speed by releasing the third friction element with hydraulic pressure, as signal pressure, to the hydraulic servo which operates the second friction element at different time of forward speed than the predetermined forward speed.

7. The hydraulic control apparatus of an automatic transmission of claim 4, further comprising a signal pressure generation means for selectively switching the second valve to a hydraulic pressure supply or a cut-off positions to the first hydraulic servo, wherein, the signal pressure generation means is a solenoid valve, capable of generating hydraulic pressure through electrical operation, and the solenoid valve switches, when there is no electric current, the position of the second valve to the position of cutting off hydraulic pressure to the first hydraulic servo.

8. The hydraulic control apparatus of an automatic transmission of claim 7, wherein the second valve is structured in such a manner that a spring force is given from one side and signal pressure from the signal pressure generation means is applied from the other side, and the signal pressure generation means switches by cutting off hydraulic pressure, when there is no electric current, the position of the second valve to the position of cutting off hydraulic pressure to the first hydraulic servo by the spring force.

9. The hydraulic control apparatus of an automatic transmission of claim 4, further comprising, a third friction element which is released with the first friction element during the low speed time and a third hydraulic servo which operates the third friction element, and a fourth valve which switches with hydraulic pressure, as signal pressure, to a third hydraulic servo which operates a fourth friction element for engaging hydraulic pressure supply or cut-off state to the third hydraulic servo during the low speed time.

10. The hydraulic control apparatus of an automatic transmission of claim 9, wherein the low speed comprises a first forward speed, a second forward speed and a third forward speed, with the speeds increasing consecutively.

11. The hydraulic control apparatus of an automatic transmission of claim 9, further comprising a fifth valve for switching hydraulic pressure supply or cut-off to the third hydraulic servo which operates the fourth friction element to be engaged during the time of the third forward speed with hydraulic pressure, as signal pressure, to the second hydraulic servo which operates fiction elements to be engaged during the time of the predetermined forward speed, and wherein hydraulic pressure to the first hydraulic servo which is operated by the signal pressure generation means is applied, as signal pressure, to the fifth valve.

12. The hydraulic control apparatus of an automatic transmission of claim 9, further comprising a sixth valve for switching hydraulic pressure supply or cut-off to the second hydraulic servo which operates the fourth friction element to be engaged during the third forward speed with hydraulic pressure, as signal pressure, to the third hydraulic servo which operates the friction element to be engaged during the time of predetermined forward speed, and wherein the sixth valve comprises a delay means which delays hydraulic pressure supply speed to the hydraulic servo which operates the friction element to be applied to the sixth valve.

13. The hydraulic control apparatus of an automatic transmission of claim 12, wherein the predetermined forward speed is the second forward speed, the friction element to be released with the first friction element during the time of the second forward speed is the fourth friction element to be engaged during the third forward speed time, and the friction element to be engaged during the second forward speed time is the third friction element to be released during the third forward speed time.

14. The hydraulic control apparatus of an automatic transmission of claim 9, further comprising;

a fifth valve for switching hydraulic pressure supply or cut-off to the hydraulic servo which operates the fourth friction element to be engaged during the time of the third forward speed with hydraulic pressure, as signal pressure, for the hydraulic servo which operates fiction element to be engaged during the time of the predetermined forward speed, a sixth valve for switching hydraulic pressure supply or cut-off to the hydraulic servo which operates the friction element to be engaged during the time of the predetermined forward speed with hydraulic pressure, as signal pressure, for the hydraulic servo which operates the fiction element to be engaged during the time of the third forward speed, and a seventh valve for switching hydraulic pressure supply or cut-off to the friction element which is to be engaged during the time of predetermined forward speed or the fourth friction element with hydraulic pressure, as signal pressure, for the fourth friction element or the friction element to be engaged during predetermined forward speed time.

15. The hydraulic control apparatus of an automatic transmission of claim 14, further comprising an eighth valve capable of selective supply or cut-off of signal pressure to the sixth valve, wherein application of signal pressure to the sixth valve and the seventh valve is cut-off by applying to the eighth valve, as signal pressure, hydraulic pressure for the hydraulic servo which operates the friction element to be engaged during the predetermined forward speed time and hydraulic pressure for the first hydraulic servo which is operated by the signal pressure generation means.

16. The hydraulic control apparatus of an automatic transmission of claim 14, further comprising a ninth valve capable of selective supply or cut-off of signal pressure to the fifth valve, wherein application of signal pressure to the fifth valve and the seventh valve is cut-off by applying to the ninth valve hydraulic pressure for the hydraulic servo which operates the fourth friction element.

17. The hydraulic control apparatus of an automatic transmission of claim 14, wherein the control means comprises a pressure adjustment valve and a solenoid valve which enables, by applying signal pressure to the pressure adjustment valve, supply of hydraulic pressure from the pressure adjustment valve to the hydraulic servo which operates the friction element, wherein, the hydraulic pressure for the hydraulic servo which operates the friction element to be applied to the fifth valve and the sixth valve is the hydraulic pressure from the solenoid valve.

18. A method of controlling friction elements in a transmission system, comprising the steps of:

providing a hydraulic source;

connecting a first, a second and a third hydraulic path to the hydraulic source;

connecting a first, a second and a third hydraulic servo with the first, second and third hydraulic paths and which operate a first, a second and at third friction element, wherein predetermined forward speeds out of a plurality of speeds are achieved by engagement of at least two friction elements;

arranging a first, a second and a third control means in the first, second and third hydraulic paths and operate an engagement and a release through a supply and removal of hydraulic pressure to the first, second and third servos, wherein, in the predetermined forward speeds, the first friction element and the third friction element are engaged by the first and third control means;

arranging a first valve on the second hydraulic path and which cuts off hydraulic pressure from the hydraulic source to the second hydraulic servo with downstream side hydraulic pressure of the first control means as a first signal pressure and with downstream side hydraulic pressure of the third control means as a second signal pressure; and arranging a second valve on the first hydraulic path and which cuts off hydraulic pressure to the first hydraulic servo and the first signal pressure, wherein the first valve cuts off the hydraulic pressure from the hydraulic source to the second hydraulic servo when both of the first signal pressure and the second signal pressure are impressed.

* * * * *